(12) United States Patent
Narroschke et al.

(10) Patent No.: US 10,015,492 B2
(45) Date of Patent: *Jul. 3, 2018

(54) FILTER POSITIONING AND SELECTION

(71) Applicant: Sun Patent Trust, New York, NY (US)

(72) Inventors: Matthias Narroschke, Schaafheim (DE); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,811

(22) Filed: May 30, 2017

(65) Prior Publication Data

US 2017/0264901 A1 Sep. 14, 2017

Related U.S. Application Data

(63) Continuation of application No. 13/640,388, filed as application No. PCT/EP2011/001794 on Apr. 11, 2011, now Pat. No. 9,712,846.

(30) Foreign Application Priority Data

Apr. 12, 2010 (EP) .................................... 10159666

(51) Int. Cl.
*H04N 19/82* (2014.01)
*H04N 19/117* (2014.01)
(Continued)

(52) U.S. Cl.
CPC ......... *H04N 19/117* (2014.11); *H04N 19/136* (2014.11); *H04N 19/147* (2014.11);
(Continued)

(58) Field of Classification Search
None
See application file for complete search history.

(56) References Cited

U.S. PATENT DOCUMENTS 5,734,757 A 3/1998 Kim
6,226,051 B1 5/2001 Beattie et al.
(Continued)

FOREIGN PATENT DOCUMENTS

EP 1 841 230 10/2007
EP 2 141 927 1/2010
(Continued)

OTHER PUBLICATIONS

International Search Report dated Jun. 9, 2011 in International (PCT) Application No. PCT/EP2011/001794.
(Continued)

*Primary Examiner* — William C Vaughn, Jr.
*Assistant Examiner* — Stuart Bennett
(74) *Attorney, Agent, or Firm* — Wenderoth, Lind & Ponack, L.L.P.

(57) ABSTRACT

The present invention relates to a method for encoding and decoding an image signal and to corresponding apparatuses therefor. In particular, during the encoding and/or decoding of an image signal filtering with at least two filters is performed. The sequence of the filter application and possibly the filters are selected and the filtering is applied in the selected filtering order and with the selected filters. The determination of the sequence of applying the filters may be performed either separately in the same way at the encoder and at the decoder, or, it may be determined at the encoder and signaled to the decoder.

1 Claim, 37 Drawing Sheets

(51) Int. Cl.
| | |
|---|---|
| *H04N 19/147* | (2014.01) |
| *H04N 19/46* | (2014.01) |
| *H04N 19/61* | (2014.01) |
| *H04N 19/136* | (2014.01) |
| *H04N 19/48* | (2014.01) |
| *H04N 19/80* | (2014.01) |
| *H04N 19/86* | (2014.01) |
| *H04N 19/42* | (2014.01) |
| *H04N 19/44* | (2014.01) |
| *H04N 19/615* | (2014.01) |
| *H04N 19/635* | (2014.01) |
| *H04N 19/68* | (2014.01) |

(52) U.S. Cl.
CPC ........... *H04N 19/439* (2014.11); *H04N 19/44* (2014.11); *H04N 19/46* (2014.11); *H04N 19/48* (2014.11); *H04N 19/61* (2014.11); *H04N 19/615* (2014.11); *H04N 19/635* (2014.11); *H04N 19/68* (2014.11); *H04N 19/80* (2014.11); *H04N 19/82* (2014.11); *H04N 19/86* (2014.11)

(56) References Cited

U.S. PATENT DOCUMENTS

| | | |
|---|---|---|
| 6,611,618 B1 | 8/2003 | Peli |
| 6,650,792 B1 | 11/2003 | Aida et al. |
| 7,436,337 B1 | 10/2008 | He |
| 7,805,016 B2 | 9/2010 | Yamaguchi et al. |
| 8,582,666 B2 | 11/2013 | Zuo et al. |
| 2001/0036320 A1 | 11/2001 | Tan |
| 2006/0291557 A1* | 12/2006 | Tourapis ............... H04N 19/46 375/240.12 |
| 2006/0294171 A1 | 12/2006 | Bossen |
| 2007/0140574 A1 | 6/2007 | Yamaguchi et al. |
| 2009/0257664 A1* | 10/2009 | Kao ..................... H04N 19/159 382/232 |
| 2010/0027686 A1 | 2/2010 | Zuo et al. |
| 2010/0278267 A1 | 11/2010 | Lai |
| 2011/0150080 A1 | 6/2011 | Watanabe et al. |
| 2014/0079330 A1 | 3/2014 | Zuo et al. |

FOREIGN PATENT DOCUMENTS

| | | |
|---|---|---|
| JP | 11-504482 | 4/1999 |
| JP | 2000-32300 | 1/2000 |
| JP | 2000-148129 | 5/2000 |
| JP | 2001-352546 | 12/2001 |
| JP | 2007-166522 | 6/2007 |
| JP | 2007-280267 | 10/2007 |
| JP | 2010-509842 | 3/2010 |
| WO | 96/35295 | 11/1996 |
| WO | 2008/057308 | 5/2008 |
| WO | 2008/075247 | 6/2008 |
| WO | WO 2008075247 A1 * | 6/2008 ............... G06T 9/00 |
| WO | 2010/001999 | 1/2010 |

OTHER PUBLICATIONS

European Search Report of European Application No. 10159666.6 dated Sep. 2, 2010.
S. Haykin, "Adaptive Filter Theory", Fourth Edition, Prentice Hall Information and System Sciences Series, Prentice Hall, 2002.
Thomas Wedi et al: "Results of H.26L core experiment on Adaptive Motion Accuracy (AMA) with ½, ¼ and ⅛ pel accuracy" ITU Study Group 16—Video Coding Experts Group—ISO/IEC MPEG & ITU-T VCEG(ISO/IEC JTC1/SC29/WG11 and ITU-T SG16 Q6), No. q15j15, May 10, 2000 (May 10, 2000), XP030003046.
Gisle Bjontegaard et al: "H.26L Core Experiment on Adaptive Motion Accuracy (AMA) for ½, ¼, and ⅛ Sample Accuracy Motion Compensation" ITU Study Group 16—Video Coding Experts Group—ISO/IEC MPEG & ITU-T VCEG(ISO/IEC JTC1/SC29/WG11 and ITI-T SG16 Q6), No. q15j09, Mar. 6, 2000 (Mar. 6, 2000), XP030003040.
Chujoh T et al: "Block-based adaptive loop filter"35. VCEG Meeting; 85. MPEG Meeting; Jul. 16, 2008-Jul. 18, 2008; Berlin; (Video Coding Experts Group of ITU-T SG.16), Jul. 17, 2008 (Jul. 17, 2008), XP030003583.
Haechul Choi et al: "High coding Efficiency video codec for entertainment-quality" Consumer Electronics (ICCE), 2010 Digest of Technical Papers International Conference on, IEEE, Piscataway, NJ, USA, Jan. 9, 2010 (Jan. 9, 2010), pp. 237-238, XP031641027 ISBN: 978-1-4244-4314-7.
Tao Chen et al: "Adaptive Postfiltering of Transform Coefficients for the Reduction of Blocking Artifacts" IEEE Transactions on Circuits and Systems for Video TECHNOLOGY, IEEE Service Center, Piscataway, NJ, US, vol. 11, No. 5, May 1, 2001 (May 1, 2001), XP011014196 ISSN: 1051-8215.
European Office Action dated Mar. 18, 2013 in corresponding European patent application No. 10159666.6.
A. Puri et al., "Video coding using the H.264/MPEG-4 AVC compression standard", Signal Processing. Image Communication, Elsevier Science Publishers, Amsterdam, NL, vol. 19, No. 9, Oct. 1, 2004, pp. 793-849, XP004067150.
SIM (ETRI and Kwangwoon Univ) D: "Modification of deblocking filter for improvement of coding efficiency", 35, VCEG Meeting; 85. MPEG Meeting; Jul. 16, 2008-Jul. 18, 2008; Berlin (Video Coding Experts Group of ITU-T SG.16), No. VCEG-AI21, Jul. 12, 2008, XP030003586.
Thomas Wedi, "Results of core experiment on Adaptive Motion Accuracy (AMA) with ½, ¼ and ⅛-pel accuracy", ITU—Telecommunications Standardization Sector Study Group 16 Video Coding Experts Group (Question 15) Tenth Meeting: Osaka, Japan, May 16, 2000, Q15-J-15, pp. 1-9.
Takeshi Chujoh, et al., "Block-based Adaptive Loop Filter", ITU—Telecommunications Standardization Sector Study Group 16 Question 6 Video Coding Experts Group (VCEG) 35th Meeting: Berlin, Germany, Jul. 16, 2008, [VCEG-AI18], pp. 1-6.

* cited by examiner

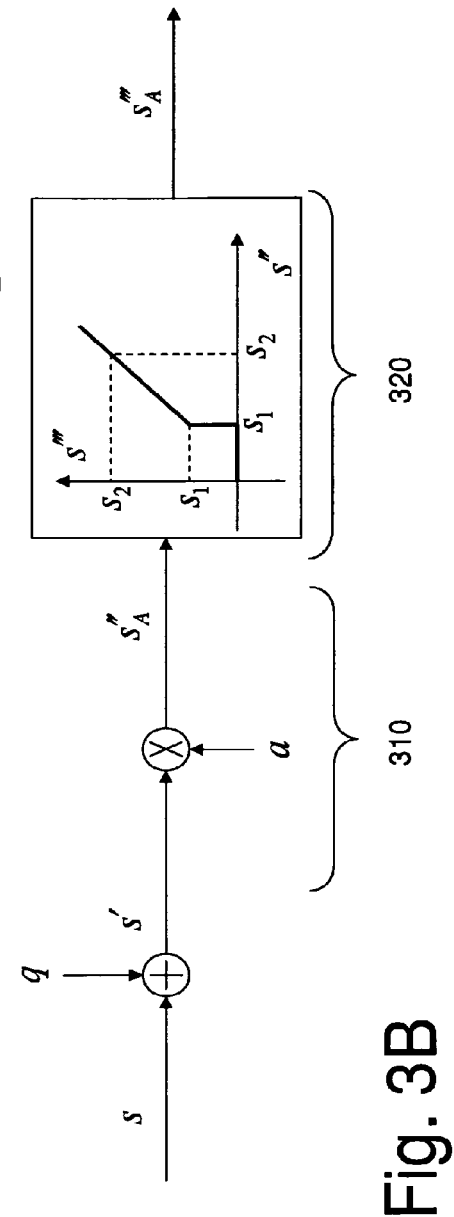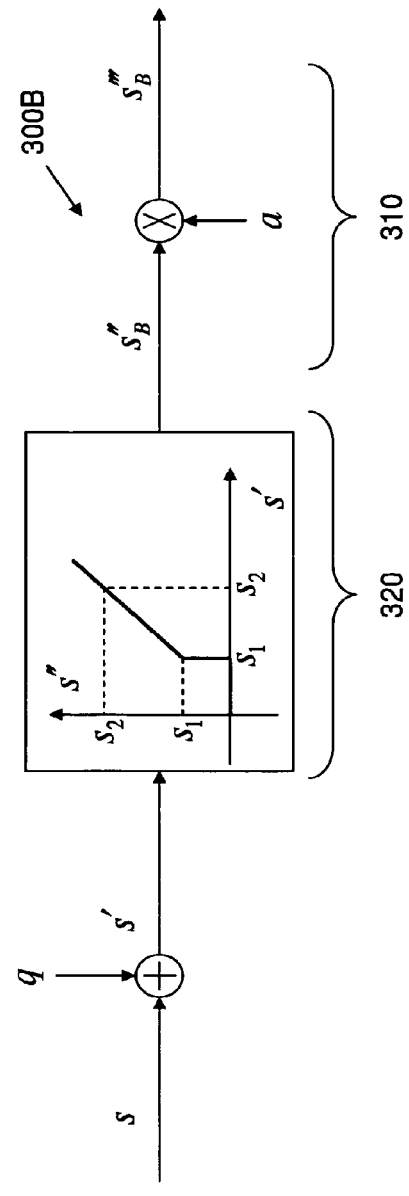

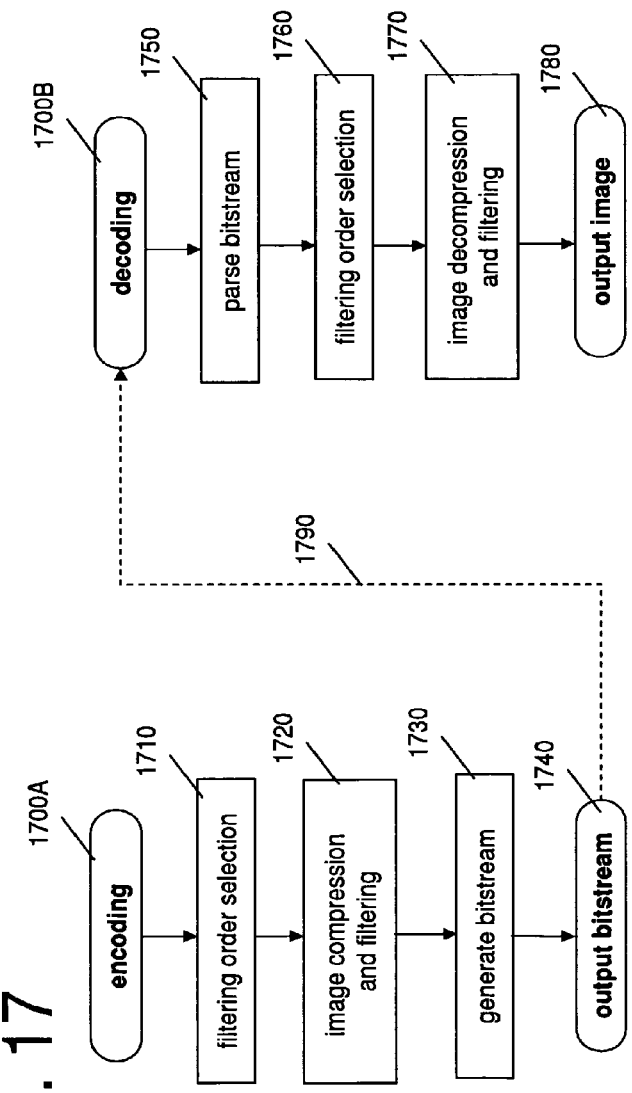
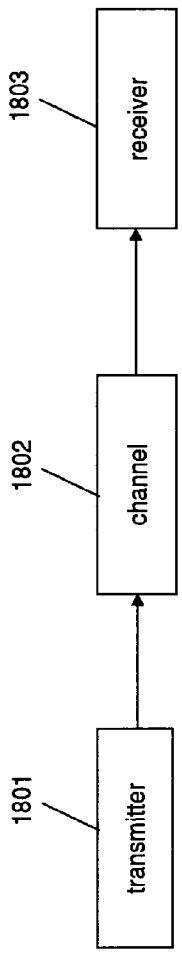
Fig. 17
Fig. 18

Fig. 25

Video stream (PID=0x1011 Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00 Secondary video)
Video stream (PID=0x1B01 Secondary video)

Fig. 36

| Corresponding standard | Driving frequency |
|---|---|
| MPEG4. AVC | 500MHz |
| MPEG2 | 350MHz |
| ... | ... |

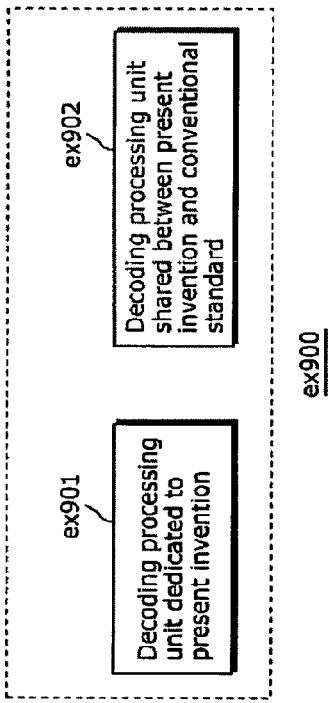
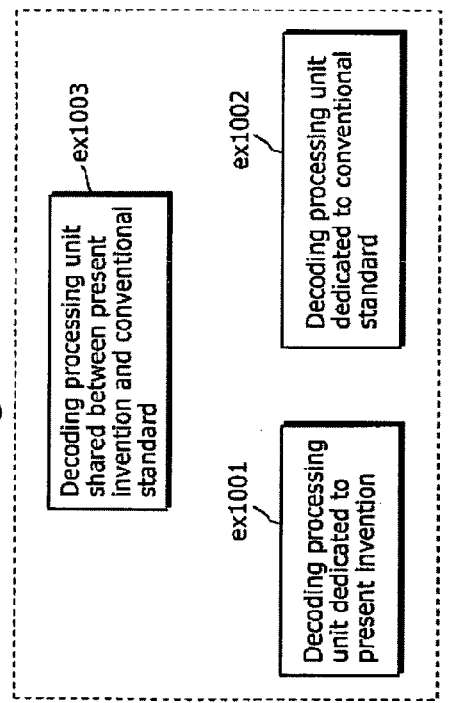

FILTER POSITIONING AND SELECTION

The present invention relates to a method and an apparatus for video encoding and decoding using filters for filtering of video signals.

BACKGROUND OF THE INVENTION

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. Typically, a macroblock (usually denoting a block of 16×16 pixels) is the basic image element, for which the encoding is performed. However, various particular encoding steps may be performed for smaller image elements, denoted submacroblocks or simply blocks and having the size of, for instance, 8×8, 4×4, 16×8, etc.

Typically, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals, is then calculated. Another encoding step is a transformation of a block of residuals from the spatial (pixel) domain into a frequency domain. The transformation aims at reducing the correlation of the input block. Further encoding step is quantization of the transform coefficients. In this step the actual lossy (irreversible) compression takes place. Usually, the compressed transform coefficient values are further compacted (losslessly compressed) by means of an entropy coding. In addition, side information necessary for reconstruction of the encoded video signal is encoded and provided together with the encoded video signal. This is for example information about the spatial and/or temporal prediction, amount of quantization, etc.

FIG. 1 is an example of a typical H.264/MPEG-4 AVC standard compliant video encoder 100. The H.264/MPEG-4 AVC standard combines all above-mentioned encoding steps. A subtractor 105 first determines differences between a current block to be encoded of an input video image (input signal) and a corresponding prediction block, which is used for the prediction of the current block to be encoded. In H.264/MPEG-4 AVC, the prediction signal is obtained either by a temporal or by a spatial prediction. The type of prediction can be varied on a per frame basis or on a per macroblock basis. Macroblocks predicted using temporal prediction are called inter-encoded and macroblocks predicted using spatial prediction are called intra-encoded. The type of prediction for a video frame can be set by the user or selected by the video encoder so as to achieve a possibly high compression gain. In accordance with the selected type of prediction, an intra/inter switch 175 provides corresponding prediction signal to the subtractor 105. The prediction signal using temporal prediction is derived from the previously encoded images, which are stored in a memory 140. The prediction signal using spatial prediction is derived from the values of boundary pixels in the neighboring blocks, which have been previously encoded, decoded, and stored in the memory 140. The memory unit 140 thus operates as a delay unit that allows a comparison between current signal values to be encoded and the prediction signal values generated from previous signal values. The memory 140 can store a plurality of previously encoded video frames. The difference between the input signal and the prediction signal, denoted prediction error or residual, is transformed resulting in coefficients, which are quantized 110. Entropy encoder 190 is then applied to the quantized coefficients in order to further reduce the amount of data in a lossless way. This is mainly achieved by applying a code with code words of variable length wherein the length of a code word is chosen based on the probability of occurrence thereof.

Intra-encoded images (called also I-type images or I frames) consist solely of macroblocks that are intra-encoded, i.e. intra-encoded images can be decoded without reference to any other previously decoded image. The intra-encoded images provide error resilience for the encoded video sequence since they refresh the video sequence from errors possibly propagated from frame to frame due to temporal prediction. Moreover, I frames enable a random access within the sequence of encoded video images. Intra-fame prediction uses a predefined set of intra-prediction modes, which basically predict the current block using the boundary pixels of the neighboring blocks already encoded. The different modes of spatial intra-prediction refer to different directions of the applied two-dimensional prediction. This allows efficient spatial intra-prediction in the case of various edge directions. The prediction signal obtained by such an intra-prediction is then subtracted from the input signal by the subtractor 105 as described above. In addition, spatial intra-prediction mode information is entropy encoded and provided together with the encoded video signal.

Within the video encoder 100, a decoding unit is incorporated for obtaining a decoded video signal. In compliance with the encoding steps, the decoding steps include inverse quantization and inverse transformation 120. The decoded prediction error signal differs from the original prediction error signal due to the quantization error, called also quantization noise. A reconstructed signal is then obtained by adding 125 the decoded prediction error signal to the prediction signal. In order to maintain the compatibility between the encoder side and the decoder side, the prediction signal is obtained based on the encoded and subsequently decoded video signal which is known at both sides the encoder and the decoder. Due to the quantization, quantization noise is superposed to the reconstructed video signal. Due to the block-wise coding, the superposed noise often has blocking characteristics, which result, in particular for strong quantization, in visible block boundaries in the decoded image. Such blocking artifacts have a negative effect upon human visual perception. In order to reduce these artifacts, a deblocking filter 130 is applied to every reconstructed image block. The deblocking filter is applied to the reconstructed signal, which is the sum of the prediction signal and the quantized prediction error signal. The video signal after deblocking is the decoded signal, which is generally displayed at the decoder side (if no post filtering is applied). The deblocking filter of H.264/MPEG-4 AVC has the capability of local adaptation. In the case of a high degree of blocking noise, a strong (narrow-band) low pass filter is applied, whereas for a low degree of blocking noise, a weaker (broad-band) low pass filter is applied. The strength of the low pass filter is determined by the prediction signal and by the quantized prediction error signal. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

Intra-coded macroblocks are filtered before displaying, but intra prediction is carried out using the unfiltered reconstructed macroblocks.

In order to be decoded, inter-encoded images require also the previously encoded and subsequently decoded image(s). Temporal prediction may be performed uni-directionally, i.e., using only video frames ordered in time before the current frame to be encoded, or bi-directionally, i.e., using also video frames following the current frame. Uni-directional temporal prediction results in inter-encoded images called P frames; bi-directional temporal prediction results in inter-encoded images called B frames. In general, an inter-encoded image may comprise any of P-, B-, or even I-type macroblocks. An inter-encoded macroblock (P- or B-macroblock) is predicted by employing motion compensated prediction 160. First, a best-matching block is found for the current block within the previously encoded and decoded video frames by a motion estimator 165. The best-matching block then becomes a prediction signal and the relative displacement (motion) between the current block and its best match is then signalized as motion data in the form of three-dimensional motion vectors within the side information provided together with the encoded video data. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. This is achieved by interpolation filter 150. According to the H.264/MPEG-4 AVC standard, a six-tap Wiener interpolation filter with fixed filter coefficients and a bilinear filter are applied in order to obtain pixel values for sub-pixel positions in vertical and horizontal directions separately.

For both, the intra- and the inter-encoding modes, the differences between the current input signal and the prediction signal are transformed and quantized by the unit 110, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality then high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding.

H.264/MPEG-4 AVC employs scalar quantization 110, which can be controlled by a quantization parameter (QP) and a customizable quantization matrix (QM). One of 52 quantizers is selected for each macroblock by the quantization parameter. In addition, quantization matrix is specifically designed to keep certain frequencies in the source to avoid losing image quality. Quantization matrix in H.264/MPEG-4 AVC can be adapted to the video sequence and signalized together with the video data.

The H.264/MPEG-4 AVC includes two functional layers, a Video Coding Layer (VCL) and a Network Abstraction Layer (NAL). The VCL provides the encoding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

In order to improve the image quality, a so-called post filter 280 may be applied at the decoder side 200. The H.264/MPEG-4 AVC standard allows the sending of post filter information for such a post filter via the SEI message. The post filter information is determined at the encoder side by means of a post filter design unit 180, which compares the locally decoded signal and original input signal. In general, the post filter information is an information allowing decoder to set up an appropriate filter. It may include directly the filter coefficients or another information enabling setting up the filter, such as cross-correlation information related to the uncompressed signal, such as cross-correlation information between the original input image and the decoded image or between the decoded image and the quantization noise. This cross-correlation information can be used to calculate the filter coefficients. The filter information, which is output by the post filter design unit 180 is also fed to the entropy coding unit 190 in order to be encoded and inserted into the encoded signal. At the decoder, the filter information may be used by a post filter, which is applied on the decoded signal before displaying.

FIG. 2 illustrates an example decoder 200 compliant with the H.264/MPEG-4 AVC video coding standard. The encoded video signal (input signal to the decoder) first passes to entropy decoder 290, which decodes the quantized coefficients, the information elements necessary for decoding such as motion data, mode of prediction etc., and the post filter information. The quantized coefficients are inversely scanned in order to obtain a two-dimensional matrix, which is then fed to inverse quantization and inverse transformation 220. After inverse quantization and inverse transformation, a decoded (quantized) prediction error signal is obtained, which corresponds to the differences obtained by subtracting the prediction signal from the signal input to the encoder in the case no quantization noise is introduced.

The prediction signal is obtained from either a temporal or a spatial prediction 260 and 270, respectively, which are switched 275 in accordance with a received information element signalizing the prediction applied at the encoder. The decoded information elements further include the information necessary for the prediction such as prediction type in the case of intra-prediction and motion data in the case of motion compensated prediction. Depending on the current value of the motion vector, interpolation of pixel values may be needed in order to perform the motion compensated prediction. This interpolation is performed by an interpolation filter 250. The quantized prediction error signal in the spatial domain is then added by means of an adder 225 to the prediction signal obtained either from the motion compensated prediction 260 or intra-frame prediction 270. The reconstructed image may be passed through a deblocking filter 230 and the resulting decoded signal is stored in the memory 240 to be applied for temporal or spatial prediction of the following blocks.

The post filter information is fed to a post filter 280, which sets up a post filter accordingly. The post filter is then applied to the decoded signal in order to further improve the image quality. Thus, the post filter is capable of adapting to the properties of the video signal entering the encoder.

In summary, in order to reduce noise, several in-loop and post filter schemes are possible within present image and video coding standards. In these filter schemes, a filter may be deployed as a post filter for filtering the decoded signal before outputting it, or as an in-loop filter for filtering any part of video signal during encoding and decoding, the filtered signal being typically stored into the frame memory in order to be used by the prediction. For instance, in current H.264/MPEG-4 AVC standard, an interpolation filter and a deblocking filter are employed as in-loop filters. A post filter may also be applied. In general, the suitability of a filter depends on the image to be filtered. The coefficients of the post filter may be designed as Wiener filter coefficients. The Wiener filter is designed to minimize the mean square error between an input signal, which is the desired signal, and the noisy signal after having applied the filter. The solution of a Wiener filter requires calculating the autocorrelation of the corrupted signal and the cross correlation between the input signal and the corrupted signal. In video coding, quantization noise is superposed to the original (input) video signal in the quantization step.

Wiener filtering in the context of video coding aims at the reduction of the superposed quantization noise in order to minimize the mean squared reconstruction error.

Further details on adaptive filter design can be found for example in S. Haykin, "*Adaptive Filter Theory*", *Fourth Edition, Prentice Hall Information and System Sciences Series, Prentice Hall,* 2002. Example of Wiener filter configurations for video coding can be found in EP 1841230. Moreover, European patent application 08020651.9 shows various possible positions and designs of filters in frequency domain which may be used during image/video encoding and decoding. Variants of noise reducing filters with more than one input are provided, for instance, in EP 2141927. Filters in the frequency domain can be used in order to reduce noise in the frequency domain, filters in the spatial domain can be used in order to reduce noise in the spatial domain.

However, the image and/or video signal may contain various noise components having different statistics. For instance, an image or video may contain the already mentioned quantization noise, blocking noise present due to separate encoding of picture blocks, and/or the noise present in the original image/video sequence caused by the capturing device. These noise components may all have different characteristics, which may further vary in time and also with the spatial location. For instance, video signals acquired by film cameras typically contain additive camera noise whereas video signals acquired by ultrasound sensors or synthetic aperture radar (SAR) sensors contain multiplicative noise. The blocking noise, on the other hand is present only at the coding block borders. The quantization noise represents another source of additive noise, which may be inserted either in the spatial or in the frequency domain, depending on the type of prediction error coding applied. The type of prediction error coding may, again, vary within an image on a block basis. Consequently, filtering with a plurality of filters applied at different stages of encoding and decoding may be essential for improving the quality of the output signal.

SUMMARY OF THE INVENTION

The problem underlying the present invention is based on the observation that the broad variety of time- and location variant noise components cannot be completely suppressed by a static filtering scheme.

The aim of the present invention is to improve the efficiency of filtering applied during image and/or video encoding and decoding in order to achieve better quality of the decoded image.

This is achieved by the subject matter of the independent claims.

Advantageous embodiments of the invention are subject to the dependent claims.

It is the particular approach of the present invention to increase flexibility of the filtering applied during the image encoding and/or decoding procedure by means of adaptively selecting the order in which different filters are applied. This selection is performed based on the noise components which are given by the encoding scheme and/or by the original input image.

Selecting of the filtering order enables filtering first with a filter for reducing the dominant noise component. Afterwards, another filter for filtering the remaining noise components may be applied. Since the dominant noise component depends on the original input image and on the encoding mechanism, adaptive selection of the filtering order provides an improvement of the decoded image quality and thus increases the coding efficiency.

In accordance with an aspect of the present invention, a method for decoding image data encoded in a bitstream is provided, employing at different stages of the decoding process of said encoded image signal at least two different filters, a first filter and a second filter. Accordingly, a sequence for applying said first filter and said second filter is selected in accordance with an encoding parameter extracted from the bitstream, and said first and said second filter are applied according to the selected sequence of filtering when decoding said encoded image data.

In accordance with another aspect of the present invention, a method for encoding image data into a bitstream is provided, employing at different stages of the encoding process of said image data at least two different filters, a first filter and a second filter. The method comprises the steps of selecting a sequence for applying said first filter and said second filter in accordance with an encoding parameter or a property of the image data, and applying said first filter and said second filter according to the selected filtering sequence when encoding said image data.

In accordance with still another aspect of the present invention, an apparatus for decoding image data encoded in a bitstream is provided, the apparatus comprising at least two different filters, a first filter and a second filter to be applied at different stages of the decoding process of said encoded image signal. The apparatus further comprises a filtering order selecting unit for selecting an order of applying said first filter and said second filter, the selection being performed in accordance with an encoding parameter extracted from the bitstream. The apparatus is configured to apply said first and said second filter according to the selected filtering order when decoding said encoded image data.

In accordance with yet another aspect of the present invention, an apparatus for encoding image data into a bitstream is provided, comprising at least two different filters, a first filter and a second filter which are to be applied at different stages of the encoding process of said image data. The apparatus further comprise a filtering order selecting unit for selecting a sequence for applying said first filter and said second filter in accordance with an encoding parameter and/or a property of the image data. Moreover, the apparatus is configured to apply said first filter and said second filter according to the selected sequence when encoding said image data.

Here, the parameter extracted from the bitstream (at the decoder) according to which the selection of the filtering order is performed, may be data dedicated to signalling of the filtering order. Such a data may be encoder settings which are set by the user before encoding. Alternatively, it may be data set automatically by the encoder, e.g. prior or during the encoding, and signalled within the bitstream. The present invention is also not limited to a particular position of such parameters within the bitstream. In general, such a dedicated parameter may be signalled within frame or slice headers, or within encoder settings for the entire sequence, or even on a per block basis.

However, the present invention is not limited to selecting the filter order based on the dedicated data. The parameter extracted from the bitstream may be an encoder setting which is generically signalled for another purpose than for determining the order. Such a parameter is, for instance, the quantization parameter and/or a parameter specifying whether the quantization is performed in frequency domain or in spatial domain. In this invention, a quantization of all prediction error samples of a block to zero may also be considered to be a quantization and/or dequantization in the spatial domain since the decoder does not need to perform an inverse transform in this case. The filtering order and/or the filter selection may also be determined based on a combination of a plurality of such parameters. In general, any parameter that has an influence on resulting image noise may be used for selecting the filters and their sequence of application. Other examples of such parameters are: size of the block, type of prediction, type of frequency domain transformation applied, etc.

At the encoder, the decision about the filter ordering at the encoder and/or at the decoder is performed based on an encoding parameter or a property of the image signal. The encoding parameter may be any encoder settings set before encoding of the particular image (block) to be encoded, for instance, quantization step, type of prediction, domain in which quantization is performed, etc. It may, however also be a setting provided by the user before encoding, dedicated to the filtering order. For example, the user may explicitly define, which filters and/or in which sequence of filtering will be applied. On the other hand, the encoder may also take into account the original signal which is not available at the decoder side and select the filtering order accordingly.

According to an embodiment of the present invention, the sequence of filtering by the first and the second filter is determined at the encoder side and at the decoder side in the same way, which means according to the same rule, so that no explicit signalling is necessary.

Preferably, the selection of the sequence for applying said first filter and said second filter is performed according to a quantization step applied for encoding the image data and/or according to the statistics of noise of the image data input for the encoding. In particular, the quantization noise may be compared with the input image noise. According to the result of the comparison, if the quantization noise is higher than the input image noise, the order of filtering may be selected so as to first reduce the quantization noise and than the input image noise. If the input image noise is higher than the quantization noise, the filtering order is selected so as to first reduce the input image noise and then the quantization noise. For instance, the first filter may be a filter for suppressing the quantization noise such as a Wiener filter (an adaptive filter), or a fixed filter. The second filter may be, for instance a filter for suppressing a multiplicative noise or a non-linear noise reduction filter, or any de-noising filter, which may be selected in accordance with the characteristics of the input image noise.

Alternatively, the selection of the filtering order may also be determined according to whether the quantization has been applied in the spatial or in the frequency domain. For the signals quantized in the frequency domain, the filter in frequency domain may be applied first and than a filter in spatial domain may be applied to the filtered signal. On the other hand, for the signals quantized in spatial domain, filtering in spatial domain may be applied first and then filtering in frequency domain may be applied to the filtered signal. However, the present invention is not limited to these examples and the first and the second filter may both be also applied in the frequency domain. The selection of order may be performed, for instance based on the quantization step size, or determined based on an optimization criterion such as a similarity, dissimilarity, or Lagrangian costs of bitrate and distortion.

According to an alternative embodiment of the present invention, the sequence of filtering by the first and the second filter is determined at the encoder side and the selection is signalled to the decoder side. This is advantageous especially in the cases where the filtering order is determined also based on the input image signal, which is not available at the decoder.

Preferably, in case of the above alternative embodiment, at the encoder a filter-sequence indicator for indicating the selected order of applying said first filter and said second filter is embedding into the bitstream comprising the encoded image data. In particular, the filter-sequence indicator indicates that the first filter is applied before applying the second filter or that the second filter is applied before applying the first filter. The filter-sequence indicator is preferably further encoded in order to increase the efficiency of its signalling. Any well-known techniques such as predictive (differential) coding and/or entropy coding may be applied. The filter-sequence indicator may be signalled either once per sequence, once per a number of frames, once per group of pictures, or once per frame, slice, or macroblock/block. The signalling may also be performed irregularly, for instance, when it is considered that the order of filters should be changed. For instance, the encoder may regularly determine the optimal filter sequence and only signal it, if it essentially improves the image quality. A rate-distortion optimization may facilitate such a decision.

Correspondingly, at the decoder the sequence for applying said first filter and said second filter is selected according to a filter-sequence indicator extracted from the bitstream comprising the encoded image data. However, as mentioned above, the filter sequence may also be selected based on other data from the bitstream such as the quantization step, information signalling whether a block/slice/frame is filtered in frequency or spatial domain, type of prediction, etc.

The term "encoder side" or "encoder" here refers to the encoder at which the original (uncompressed) image data is input and the encoded image data is output as a bitstream. The encoder at the encoder side may also include parts of a decoder. In contrast, the term "decoder side" or "decoder" here refers to the decoder at which the original (uncompressed) image data is not available. The decoder may be located at another site than the encoder, or within the same apparatus, however, it is assumed that the original input image signal is only available to the encoder side. The decoder side receives the encoded image data as a bitstream and decodes it. The decoder at the decoder side may also include some parts of an encoder.

For both above embodiments of the present invention, the at least two filters, in particular, the first and the second filter are preferably selected from a plurality of predefined filters or from a plurality of filter types. Filter types may be, for instance, types of filter with a different purpose such as a de-blocking filter, an additive noise suppressing filter, a multiplicative noise suppressing filter, an interpolation filter, etc. Furthermore, the type of filter may be a type of filter implementation such as a linear filter, a non-linear filter, or, more particular, an FIR filter, an IIR filter, a median filter; it may be an adaptive filter such as the Wiener filter. The type of filter may further include the order of the filter. The predefined filter may be a filter with a predefined order and/or coefficients.

The selection of the filters may be performed in the same way at the encoder and at the decoder, based on information which is available at both, the encoder and the decoder such as encoder settings, for instance, type of prediction, parameters related to quantization, type of the input image, etc.

Alternatively, the selection of filters is signalled from the encoder side to the decoder side. This is performed, for instance by embedding a filter-selection indicator for indicating the selected first and the selected second filter into the bitstream including also the encoded image data. Similarly to the filter-sequence indicator, the filter-selection indicator is preferably further encoded by a differential, predictive, and/or entropy coding. The filter-selection indicator may also be signalled as described above for the filter-sequence indicator. In particular, the selection of the filter includes selection of the filter type and/or the filter order and/or the filter coefficients.

The selection of the first and the second filter and/or of the sequence of their application may be performed by maximizing a similarity between the original image data input to the encoding and the encoded image data, or correspondingly by minimizing the dissimilarity. In particular, a similarity measure such as correlation or covariance may be calculated between the original input signal and the filtered or finally decoded signal for each selected filter, or each selected combination (filters and their order) of filters. The filter(s) and possibly also their order is then selected so as to maximize the correlation. Alternatively, Lagrangian costs of bitrate and distortion may be used to arrive at an optimal solution. The selected filters are then applied according to the selected sequence of their application when encoding said image data.

Each of the first and the second filter may be applied at the different stage of decoding such as an loop-filter or a post filter. Each filter may have a fixed order or a variable order; the fixed or variable coefficients or may be implemented as an adaptive filter such as the Wiener filter. Any filter such as a two-dimensional, or a one-dimensional filter is applicable. The filter may be linear or non-linear.

Each of the first and the second filter may be applied to at least one of a prediction error signal, reference signal, reconstructed signal and prediction signal in spatial or in frequency domain. Advantageously, the first or the second filter has more than one of the above signals as input signals. The filtering may be performed separately for a plurality of these signals and the results of filtering may be then combined in the resulting filtered signal. This provides the advantage of individually considering the possibly different characteristics of signals contributing to the reconstructed image signal, which may lead to a higher filtering/coding efficiency.

According to another embodiment of the present invention, at a plurality of filtering stages a filter is selected from a pool of different filters leading to selecting in this way also the sequence of their application. The filtering stages may be immediately following each other, for instance, each output of a previous filter is input directly into a next filter. However, in general, also other processing blocks may be between the first and the second filter.

In accordance with still another aspect of the present invention, a computer readable medium storing instructions that, when executed by the processor, perform any of the above described methods.

The above and other objects and features of the present invention will become more apparent from the following description and preferred embodiments given in conjunction with the accompanying drawings in which:

FIG. 3A is a schematic drawing illustrating a system applying two filters in a first order;

FIG. 3B is a schematic drawing illustrating a system applying two filters in a second order;

FIG. 17 is a flow diagram of a generalized example of a method according to the present invention;

FIG. 18 is a block diagram illustrating a system for transmitting and receiving a signal encoded in accordance with the present invention;

FIG. 25 is a schematic drawing showing a structure of multiplexed data;

FIG. 36 is a schematic drawing showing an example of a look-up table in which the standards of video data are associated with the driving frequencies;

FIG. 37A is a schematic drawing showing an example of a configuration for sharing a module of a signal processing unit, and FIG. 37B is a schematic drawing showing another example of a configuration for sharing a module of a signal processing unit.

DETAILED DESCRIPTION

Figure 1:
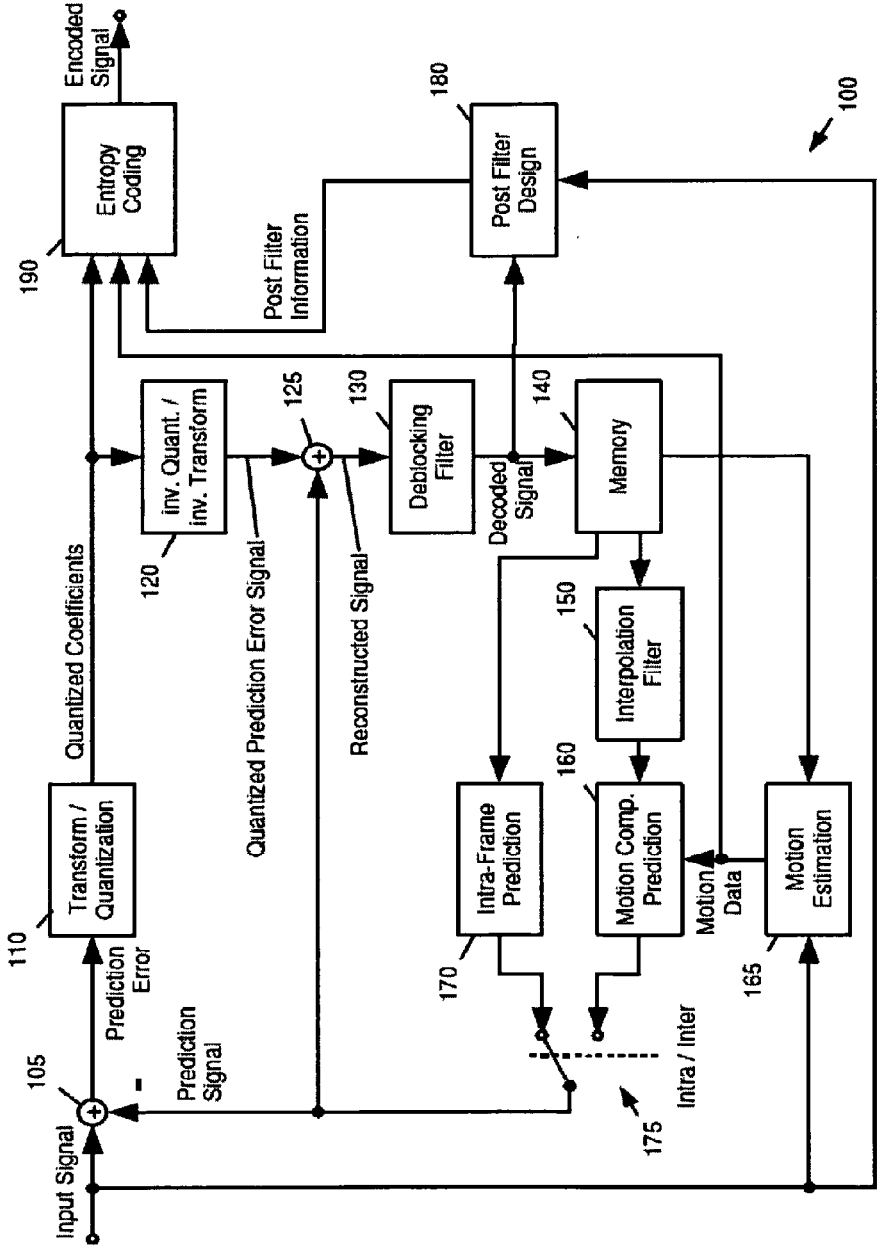
FIG. 1 is a block diagram illustrating an example of a conventional H.264/MPEG-4 AVC video encoder.
Figure 2:
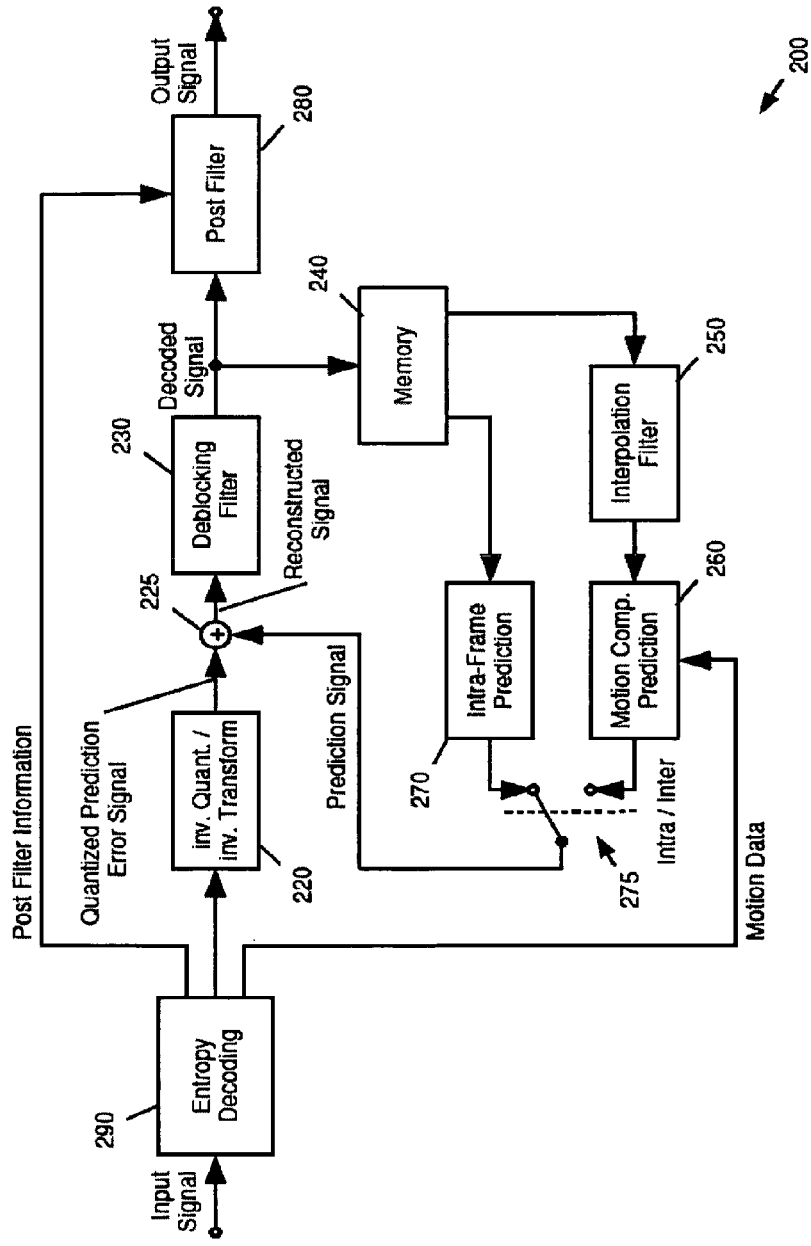
FIG. 2 is a block diagram illustrating an example of a conventional H.264/MPEG-4 AVC video decoder.

Image and video signals typically include noise. Such noise can have various statistics depending, for instance, on the source of the image or video signal. The statistics of the noise can vary. It varies typically with the time and may also vary with the spatial location. For instance, video signals acquired by film cameras typically contain additive camera noise, whereas video signals acquired by ultrasound sensors or synthetic aperture radar (SAR) sensors may contain multiplicative noise. Thus, the statistics of the noise in the signal to be coded can vary.

Moreover, the image and video coding typically includes a quantization. The quantization further disturbs the video signal by additional noise, called quantization noise. The statistics of the quantization noise varies with the kind of applied coding such as prediction error coding—such as none, spatial or temporal, wherein the kind of applied coding may usually vary from block to block.

In general, the input image or video signal may already contain some noise (input noise), and the image/video compression may result in including even more noise into the image such as quantization noise.

For different applications, the aim of the filtering may also differ. For instance, in some applications it is desirable to suppress or reduce both kinds of noises: the input noise as well as the noise caused by the image/video compression. On the other hand, there are also applications, for which it is rather desirable to preserve the input noise. For instance, images or videos captured on a celluloid film include a characteristic film grain noise. For some applications (for instance, digitalization of film archives) it is desirable to maintain this kind of noise in the image/video.

In general, the known filter techniques aim at the reduction of noise under an assumption that the noise has a specific statistics. When the image or video noise has a different statistics than assumed, then the filtering designed under said assumptions cannot efficiently remove the noise.

According to a present invention, the order of applying different filters for filtering an image signal is selected. Selecting the order of filtering according to the coding parameters and/or input image signal may increase the efficiency of coding as will be showed below. This flexibility of selecting the sequence of filtering also enables to filter as first the dominant noise that is desired to be suppressed/reduced.

At the encoder, the selection of the filter ordering is performed based on an encoding parameter or a property of the image signal. The encoding parameter is any encoder parameter set before encoding of the particular image (block) to be filtered. Such an encoder parameter may be, for instance, quantization step, type of prediction, domain in which quantization is performed, etc. Alternatively, it may be a setting provided by the user before encoding, dedicated to the filtering order.

In addition, the filters to be applied as well as the number of the filters may be selected. Advantageously, there is a variety of filter types (which may include already known and applied filters as well as new filters, and/or adaptive filters) available. One or several of these filters are then selected adaptively selected as well as the sequence (order) of their application. In accordance with an embodiment of the present invention, both, the selection of the filters and their application order is coded and transmitted to the decoder side. In case of hybrid video coding, this may be performed, for instance, in the in-loop and/or in the post filtering stage. In accordance with another embodiment of the present invention, the filter selection and/or the order of their application is performed implicitly in the same way at the encoder and at the decoder such that no additional signaling is necessary between the encoder and the decoder.

FIG. 3A illustrates a system 300a in which an input signal s is added to a noise q resulting in a noisy signal s'. The noisy signal s' is then filtered by two different filters 310 and 320 in order to obtain a filtered signal s"$_A$. The noisy signal s' is at first filtered by a first filter 310 from which a signal s"$_A$ is output. The output signal s'$_A$ of the first filter 310 is then input to a second filter 320 which outputs the filtered signal s'"$_A$. The schematic representation of the first filter in FIG. 3A illustrates a finite impulse response filter of the first order with a single coefficient a, wherein the filtering of the noisy signal s' is performed as multiplication of the noisy signal s' with the single filter coefficient a. In the same example, the second filter 320 is illustrated as a high pass filter, having filter function according to which zero is output if the input noisy signal s' has a value between 0 and $s_1$ and a linear function of the input noisy signal value is output if the input noisy signal has a value larger than $s_1$. However, the filters 310 and 320 are only examples and any other filter types may be used instead.

FIG. 3B illustrates a system 300b similar to the system 300a, however, with a different order of filters 310 and 320. In particular, the input signal s is added a noise q resulting in a noisy signal s', which is input to the filter 320. After filtering the noisy input signal s' with the filter 320, a signal s"$_B$ is obtained. The signal s"$_B$ filtered by the filter 320 is then input to the filter 310 and filtered, resulting in a filtered signal s'"$_B$ In accordance with the present invention, the order of filters such as 310 and 320 may be selected, which means that either the system 300a or the system 300b may be employed for filtering the input noisy signal s'. Such a selection of a sequence for applying the filters may increase the efficiency of the encoding. The increased efficiency results from the fact that for different input noisy signals s' different sequence of applying the filters may result in a better quality as shown in the following.

Figure 4A:
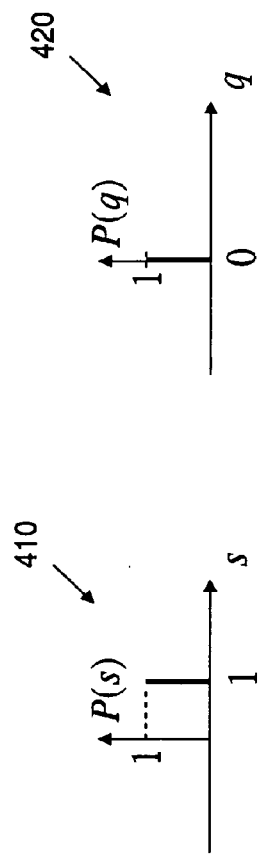
FIG. 4A represents graphs of a first example of input signal and noise signal.

FIG. 4A illustrates a probability function P(s) 410 of the input signal s and a probability function P(q) 420 of the noise signal q. It is further assumed that the filter coefficient of the filter 310 in FIGS. 3A and 3B is a=0.5 and that $s_1$=0.75. If the noisy signal s' resulting from addition of the input signal s and noise signal q with probability distributions 410 and 420, respectively is input to the system 300a, the resulting filtered signal s'"$_A$ will be s'"$_A$=0. The corresponding mean square error is given by:

$$MSE=E[(s-s''')^2]=E[(1-0)^2]=1.0.$$

If, on the other hand, the noisy signal s' obtained by adding the input signal s with probability distribution 410 and noise signal q with probability distribution 420 is input to the system 300b, the filtered signal s'"$_B$ will be s'"$_B$=0.5. The corresponding mean square error is given by:

$$MSE=E[(s-s''')^2]=E[(1-0.5)^2]=0.25.$$

As can be seen from the above, for the given input signal s and noise signal q, system 300b results in a higher quality of the filtered signal s'".

Figure 4B:
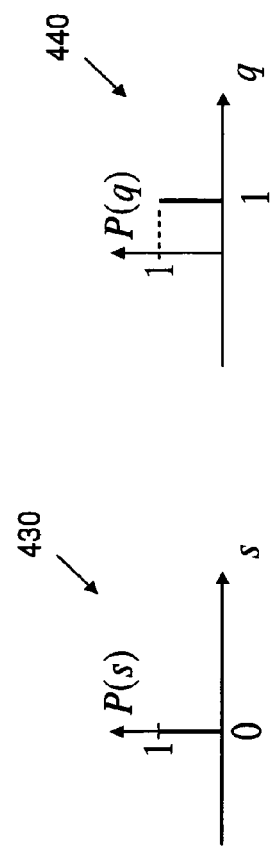
FIG. 4B represents two graphs illustrating a second example of an input signal and a noise signal.

FIG. 4B illustrates input signal s with another probability distribution 430 and noise signal view with another probability distribution 440. Similarly to the previous example, it is assumed that the first filter 310 and the second filter 320 has the respective parameters a=0.5 and $s_1$=0.75. The input noisy signal s' is again obtained by adding the input signal s with probability distribution 430 and the noise signal q with probability distribution 440. If such a noisy input signal s' is input to the system 300a, the filtered signal s'"$_A$ will be s'"$_A$=0. The corresponding mean square error is given by:

$$MSE=E[(s-s''')^2]=E[(0-0)^2]=0.$$

If, on the other hand, the input signal s' is input to the system 300b, the filtered signal s'"$_B$ will be s'"$_B$=0.5. The corresponding mean square error is then given by:

$$MSE=E[(s-s''')^2]=E[(0-0.5)^2]=0.25.$$

As can be seen from the above, for the input noisy signal s' obtained by adding the input signal s and the noise q with probability distributions 430 and 440 respectively, the system 300a provides better quality of the filtered signal s'". Consequently, the quality of filtered signals depends on the order of filters 310 and 320. Moreover, for different kinds of input signals and noise signals, different sequence of applying the filters may lead to less distortion which means to a better quality of the filtered signal.

Figure 5:
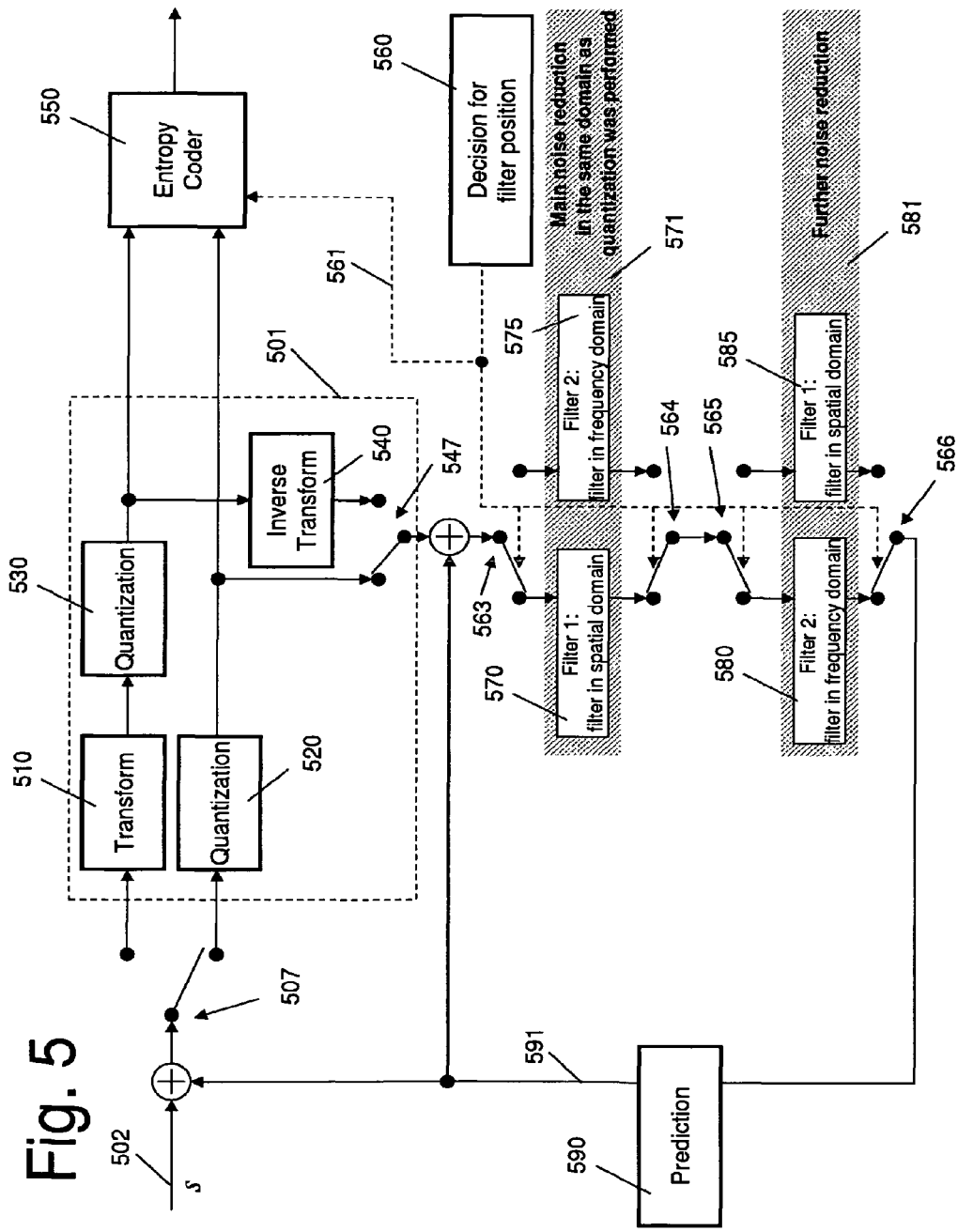
FIG. 5 is a block diagram illustrating an example encoder supporting the selection of sequence of applying two different filters in accordance with the present invention.

FIG. 5 is a block diagram which shows an encoder in accordance with an embodiment of the present invention. Input signal 502 is predicated 590 spatially or temporally as described above and the resulting prediction signal 591 is subtracted from the input signal 502 resulting in an error prediction signal which is further encoded using an adaptive prediction error coding 501 in spatial or in frequency domain. In particular, the adaptive prediction error coding may be applied in accordance with a switch 507 either in the spatial domain or in the frequency domain. The spatial domain coding applies quantization 520 to the prediction error signal directly. The frequency domain coding applies first the transformation 510 to the prediction error signal and then applies quantization 530 to the transformation coefficients output from the transformation 510. The resulting quantized prediction error is further input to the entropy coder 550. Quantizing 520 of the prediction error signal can be seen as superposing a quantization noise to the prediction error signal in the spatial domain. Quantizing 530 of the transformed prediction error signal can be seen as superposing of quantization noise to the transformation coefficients, i.e. in the frequency domain (domain of spatial frequency). In this embodiment, a quantization of all prediction error samples of a block to zero may also be considered to be a quantization and/or dequantization in the spatial domain since the decoder does not need to perform an inverse transform in this case.

After the encoding of the prediction error signal, the image signal is reconstructed by adding the quantized prediction error signal to the prediction signal 591. In FIG. 5, switch 547 is connected with the switch 507 and selects the output of encoding in spatial domain or the output of encoding in frequency domain. Before reconstruction, the prediction error signal encoded in the frequency domain has to be inversely transformed 540. The reconstructed image signal is filtered. In accordance with the present invention, the sequence of applying a plurality of filters is selected. In this example, two different filters are applied to the reconstructed image signal: a filter in the spatial domain and a filter in the frequency domain.

It is advantageous to first filter in the domain in which the quantization has been performed, which means in the domain in which the quantization noise has been superposed. If the prediction error signal was encoded in the spatial domain, it is advantageous to filter the reconstructed image signal also in the spatial domain. In order to facilitate this, a first filter 570 may be applied in the spatial domain. If the prediction error coding was performed in the frequency domain, it is advantageous to filter the reconstructed video signal with a second filter 575 in the frequency domain.

The purpose of the first filtering stage 571 is to reduce the main noise which is in the same domain as the domain in which the quantization has been performed. The second filtering stage 581 is applied in order to further reduce the remaining noise. In particular, if the prediction error coding was performed in the spatial domain, the second filter 580 is applied in the frequency domain to the signal already filtered 570 in the spatial domain.

Similarly, if the prediction error signal was encoded in the frequency domain, a first filter 585 in the spatial domain is applied to the signal already filtered 575 in the frequency domain. The switching between the two orders of applying the filtering, namely, applying the filter in spatial domain and then in the frequency domain or applying the filter in frequency domain and then in spatial domain, is performed by means of switches 563, 564, 565, and 566 which are controlled by a filter order determining unit 560. The filter order determining unit 560 may control the switches 563, 564, 565 and 566 based on the position of the switches 507 and 547 specifying whether the prediction error coding is performed in spatial or in frequency domain. Since the type of prediction error coding is typically signaled to the decoder, no additional signaling is necessary for decoder to determine the filtering order. The frequency domain filter may be any linear or non-linear filter with fixed or adaptive filter coefficients.

However, the present invention is not limited thereto and, in general, the decision of order of filtering may be performed independently of whether the prediction error signal coding was performed in the spatial or in the frequency domain. In such a case, in accordance with another embodiment of the present invention, the selected order of filtering 561 is advantageously embedded 550 into the bit stream and provided to the decoder side. In case that the filter order determining unit 560 decides the order of filtering in accordance with switches 507 and 547, the decoder side may also implicitly derive the order based on whether the decoding of the image data takes place in the spatial order frequency domain. The filtering sequence indicator 561 may be entropy encoded before its embedding into the bit stream.

According to another embodiment of the present invention, the filtering order is selected based on the quantization step applied for quantizing the prediction error signal.

Figure 6:
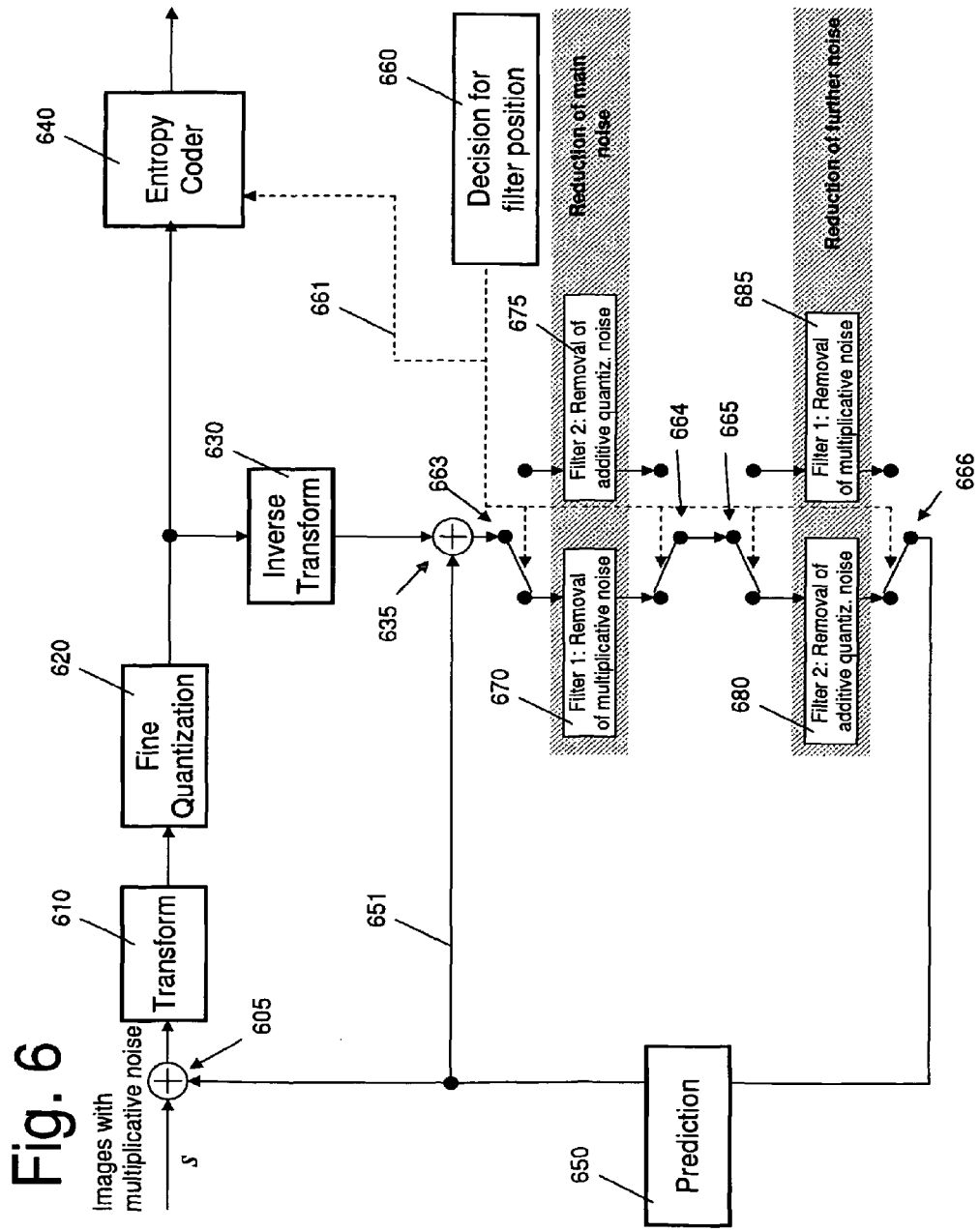
FIG. 6 is a block diagram illustrating an example of selecting the sequence of filters during encoding with a fine quantization.

FIG. 6 shows an image with a multiplicative noise input to the encoder. The image is predicted 650 and the prediction signal 651 is subtracted 605 from the input image signal s. The resulting prediction error signal is then transformed 610 and quantized 620 using a fine quantization which means a quantizer with relatively small quantization steps. The quantized transformation coefficients are then entropy coded and embedded into the resulting bit stream. Moreover, the quantized transformation coefficients are further inverse transformed 630 and used for reconstructing 635 of the reconstructed image signal by adding the prediction signal 651 to the inverse transformed signal.

Depending on the quantization step size, the filter order determining unit 660 selects the order of the first and the second filter for filtering the reconstructed image signal. In particular, FIG. 6 shows the positions of switches 663, 664, 665 and 666 resulting in applying first a filter 670 for removing of the multiplicative noise and afterwards applying to the signal filtered with the first filter a second filter 680 for removing the additive quantization noise. This positioning of switches results from the encoding parameter, such as the quantization parameter, which indicates a fine quantization 620, i.e. a quantization with a rather small quantization step. Similarly to the previously described example, a filter sequence indicator 661 may be generated by the filter order determining unit 660 and input to the entropy coder 640. In the entropy coder 640, the filter sequence indicator is further embedded into the bit stream comprising the encoded image signal. The embedded indicator may also be encoded in order to increase the image signal coding efficiency.

Figure 7:
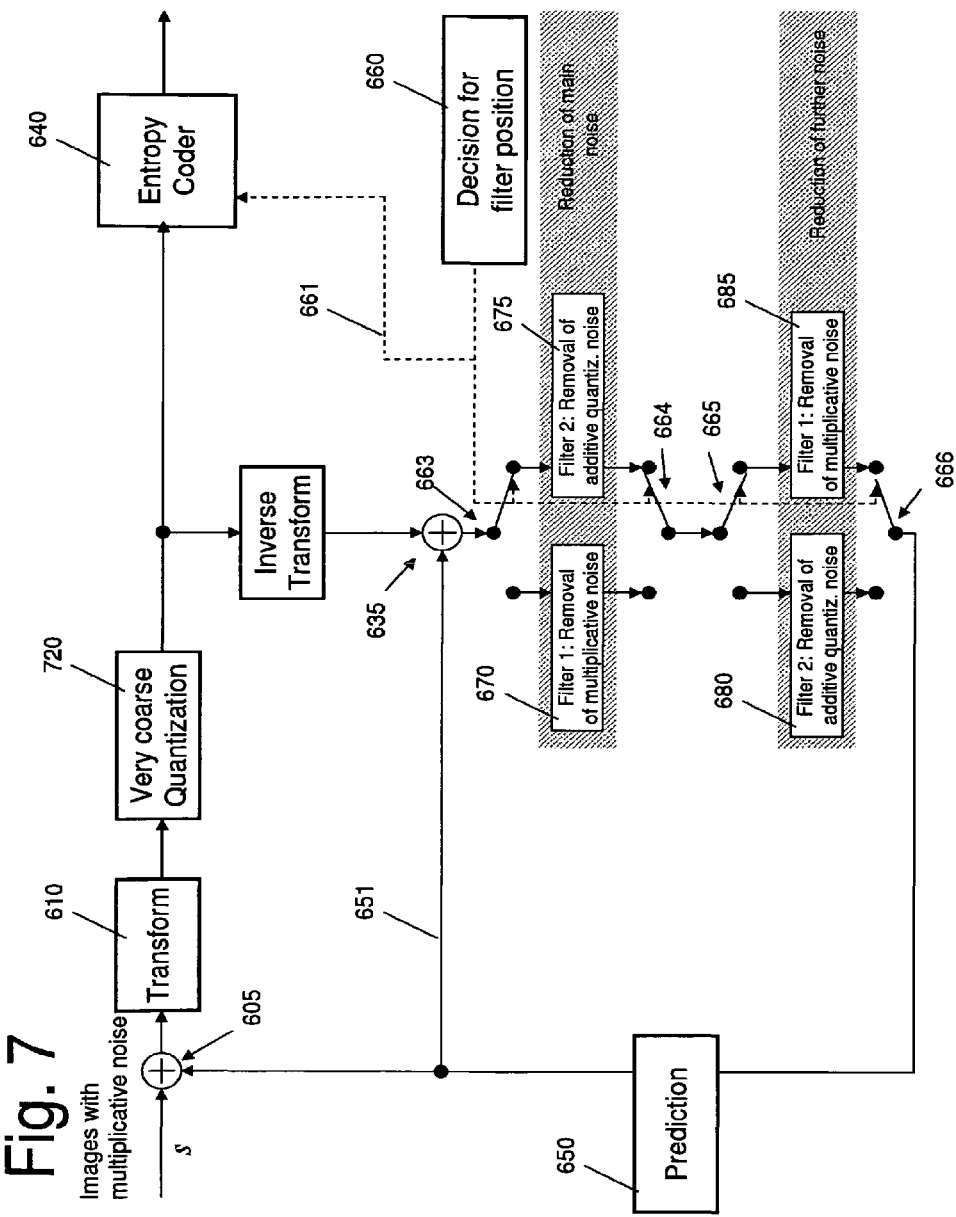
FIG. 7 is a block diagram illustrating an example of selecting the sequence of applying filters during encoding with a very coarse quantization.

FIG. 7 is a block diagram illustrating a similar to the encoder described with reference to FIG. 6. However, the encoder of FIG. 7 applies to the transformed 610 prediction error signal the quantization 720, which is very coarse, which means that the quantization step is rather large. In this case, the filter order determining unit 660 selects a different order of applying the filters. In particular, the switches 663, 664, 665 and 666 are set so as to filter the reconstructed image signal, firstly with a second filter 675 for removing the additive quantization noise and then with a first filter for removing the multiplicative noise.

The image input to the encoder illustrated in FIGS. 6 and 7 is an image containing multiplicative noise. This may, for instance, be a synthetic aperture radar signal or an ultrasound signal. The filter order is selected dependent on the amount of the additive quantization noise caused by quantization 620 and 720. In particular, if the additive noise has a higher energy than the multiplicative noise, then the reduction of the additive noise is performed at the first filtering stage, followed by the second filtering stage for reducing the multiplicative noise, as shown in FIG. 7. If, on the other hand, the additive noise has lower energy than the multiplicative noise, then the reduction of multiplicative noise is performed in the first stage of filtering and at the second stage, the additive quantization noise is reduced as shown in FIG. 6.

In the previous examples, the filters to be applied have been defined and the filter order determining unit 560 and 660 only selects the sequence in which these filters are to be applied. However, based on the input signal and based on the encoding settings, it may be beneficial to also adaptively select the number, and/or the type, and/or the coefficients of the filters to be applied.

Figure 8:
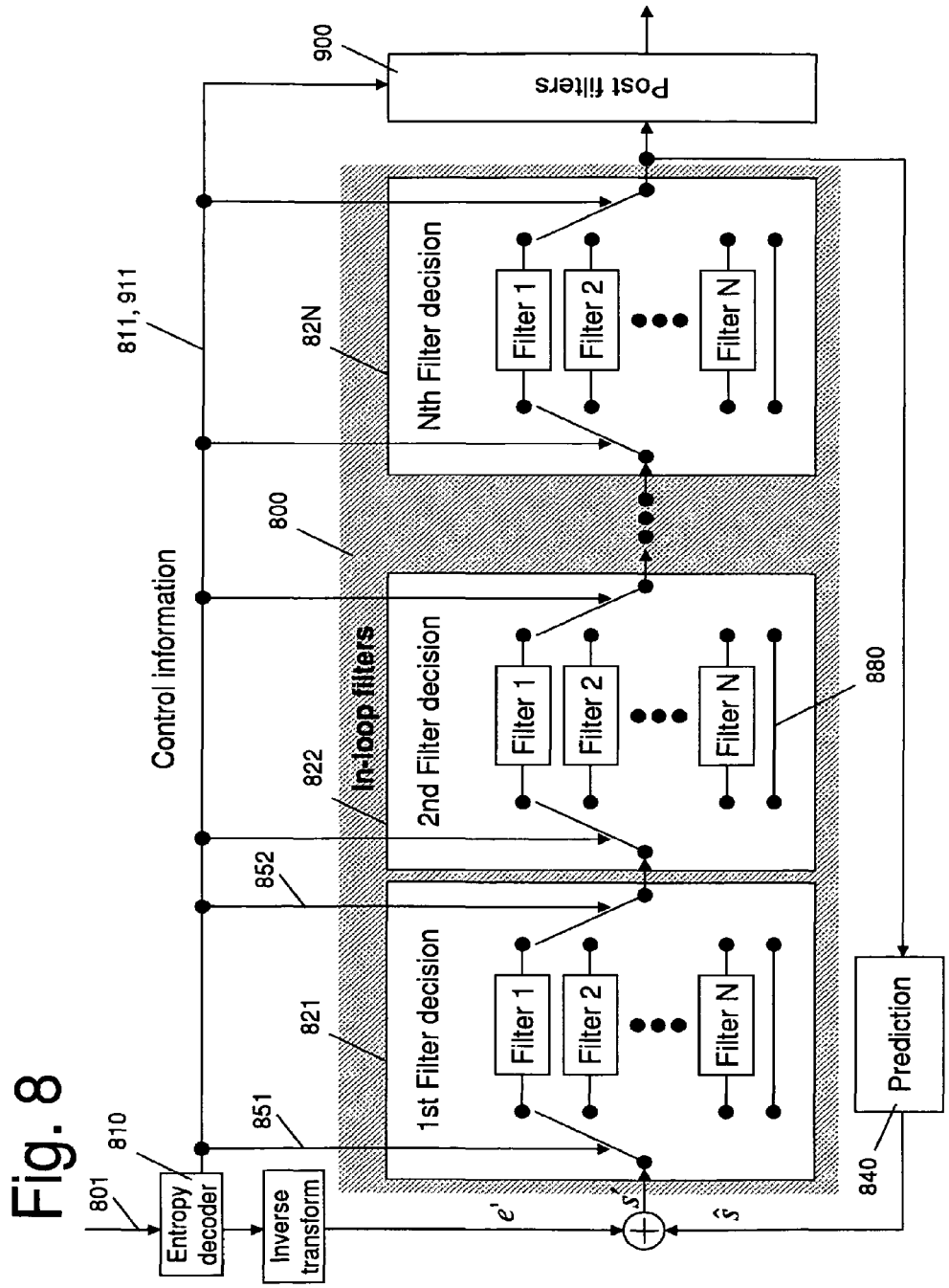
FIG. 8 is a block diagram illustrating an example decoder enabling selection of an in loop filter in accordance with an embodiment of the present invention.

In accordance with another embodiment of the present invention, in addition to selecting the filtering order, the filters may be selected as well. FIG. 8 shows a generalized example decoder with N in-loop filter stages. A bit stream 801 enters an entropy decoder 810. The entropy decoder extracts from the bit stream 801 control information 811 for indicating the selection of filters and/or the sequence of their application. Furthermore, the entropy decoder 810 extracts from the bit stream the transformed prediction error signal, which is inversely transformed and used for reconstruction of the reconstructed image signal s'. The reconstruction is performed by adding the prediction error signal e' and the prediction signal ŝ. The prediction signal ŝ is a result of a prediction 840, e.g. a temporal or a spatial prediction. The resulting reconstructed image signal s' is then entered to a cascade of a plurality of in-loop filters. In particular, FIG. 8 shows a general scheme with N filtering stages, wherein, in each filtering stage, one of N predefined filters and/or no filter 880 may be selected. This selection is equivalent to selecting the sequence of applying one of the N filters or no filter. In other words, selecting one of N+1 (N filters+no filter) filters at each of N subsequent filtering stages corresponds to selecting an order for at least a subset (since also a "no filter" option may be selected) of the N filters. The selection in this example is controlled by controlling switches 851, 852 and 85N, by means of which at each of the filtering stages 821, 822 . . . , 82N one of the N filters or no filter is selected. In addition to the control information 811, control information 911 may similarly control the selection/ordering of a cascade of filters applied for post filtering 900.

As described above, the filter selection of filters and their ordering may be performed based on the quantization step size which has been used in the quantization step 120. The quantization step size is often coded by a so called quantization parameter QP. In H.264/MPEG-4 AVC, the dependency between the quantization step size $\Delta(QP)$ and the QP is, for instance:

$$\Delta(QP) = \Delta_0(QP \bmod 6) \cdot 2^{\lfloor QP/6 \rfloor}, \text{ with } \Delta_0(k) = \frac{1}{16} \cdot \begin{cases} 10; & k=0 \\ 11; & k=1 \\ 13; & k=2 \\ 14; & k=3 \\ 16; & k=4 \\ 18; & k=5 \end{cases}$$

with QP∈{0, 1, . . . , 51}. This can be seen as a selection of one of 52 available scalar quantizers.

One possibility to select the ordering of filters (the sequence of their application) based on the quantization step size is to determine a threshold τ for the quantization step size at the encoder side, to code and transmit the determined threshold to the decoder side, and to select whether to apply a first filter before a second filter or vice versa based on the threshold, for instance as:

QP<τ ⇒ Filter 1 before Filter 2, and
QP≥τ ⇒ Filter 2 before Filter 1,

In this example, Filter 1 is a filter for reducing multiplicative noise of the input signal and Filter 2 is a filter reducing additive quantization noise.

The filter for reducing the additive quantization noise could be a Wiener Filter. The filter reducing the multiplicative noise could be, for instance, a median filter. For small quantization step sizes below the threshold, in which the additive quantization noise has a smaller energy than the multiplicative noise, the filter reducing the multiplicative noise could be selected to be applied before the filter reducing the additive noise. For large quantization step sizes above the threshold, in which the additive quantization noise has a higher energy than the multiplicative noise, the filter reducing the additive noise could be selected to be applied before the filter reducing the multiplicative noise. By having this order, the noise of higher energy is reduced first and does thus not hinder the reduction of the other noise of lower energy as also described with reference to FIGS. 6 and 7.

The threshold τ may also be a fixed predefined value. Since the order is determined implicitly based on the QP, no additional bit rate is required to explicitly signal the ordering to the decoder. Since the bit rate is not increased and the noise is efficiently reduced, the overall coding efficiency is increased.

However, the quantization noise, in general does not only depend on the quantization parameter, but may also slightly depend on the signal input to the quantization, especially if the quantization parameter is high, which means coarse quantization. In addition, it is possible to apply several individual thresholds $\tau_i$, which may be adapted locally to real (effective) additive quantization noise. In the case of coarse quantization, the quantization error is generally high if the prediction error is high. In the extreme case, the quantization error equals to the prediction error. On the other hand, the quantization error is rather low if the prediction error is low. In the extreme case, the quantization error is zero.

In general, the prediction error for a current image block is rather high, for instance if:

Absolute value of the motion vector $\vec{d}$ of the current block is large, or the absolute value of at least one component is large. This indicates fast movement, for instance, fast moving objects and thus large quantization error energy.

Motion vector $\vec{d}$ of the current block differs substantially from motion vectors of its surrounding blocks $\vec{d}_{SB}$. This may be, for instance, an indication for an object boundary and thus an indicator for large quantization error energy.

Small block size is used for motion compensated prediction. Typically, large blocks are used for the motion compensated prediction of background or of large regions within a moving object. The prediction error energy and thus also the quantization error energy are typically small for large blocks. At object boundaries, generally smaller blocks are used to adapt the motion compensated prediction to the object boundaries at which the motion of the object differs from the motion of the background. Generally, directly at the object boundaries, the prediction error energy and thus also the quantization error energy are largest. Here, generally small blocks are used. Thus, the use of small blocks is an indicator for object boundaries and thus an indicator for large quantization error energy.

Intra-prediction mode is not the DC-Mode. This may indicate that there are large changes in the signal, which cannot be predicted accurately. It thus indicates large quantization error energy.

Motion vector points to a sub-pel position, for which interpolation is required. This may be an indication that the prediction error is large due to aliasing components. It thus indicates large quantization error energy.

Thus, based on the criterions above, several thresholds $\tau_i$ may be used to be compared with the quantization parameter, such as thresholds $\tau_1$, $\tau_2$, and $\tau_3$:

Threshold $\tau_1$ is used if $|\vec{d}| < \tau_{\vec{d}}$,

Threshold $\tau_2$ is used if $|\vec{d}| \geq \tau_{\vec{d}}$ and $|\vec{d} - \vec{d}_{SB}| \leq \tau_{\Delta\vec{d}}$, and Threshold $\tau_3$ is used if $|\vec{d}| \geq \tau_{\vec{d}}$ and $|\vec{d} - \vec{d}_{SB}| > \tau_{\Delta\vec{d}}$, Wherein each of the thresholds $\tau_1, \tau_2, \tau_3, \tau_{\Delta\vec{d}}, \tau_{\vec{d}}$, may be coded and transmitted to the decoder. In this case, it may be beneficial to choose $\tau_1 \geq \tau_2 \geq \tau_3$, since the at the same QP, the prediction error and thus also the quantization error would increase from the condition associated to $\tau_1$ to the condition associated to $\tau_3$:

Condition associated to $\tau_1: |\vec{d}| < \tau_{\vec{d}}$. Meaning: Small motion vector=>The energy of the prediction error is small=>The energy of the additive quantization error is small.

Condition associated to $\tau_2: |\vec{d}| \geq \tau_{\vec{d}}$ and $|\vec{d} - \vec{d}_{SB}| \leq \tau_{\Delta \vec{d}}$. Meaning: Large motion vector and small difference of motion vector to the ones of neighboring blocks=>The energy of the prediction error is medium=>The energy of the additive quantization error is medium.

Condition associated to $\tau_3: |\vec{d}| \geq \tau_{\vec{d}}$ and $|\vec{d} - \vec{d}_{SB}| > \tau_{\Delta \vec{d}}$. Meaning: Large motion vector and large difference of motion vector to the ones of neighboring blocks=>The energy of the prediction error is large=>The energy of the additive quantization error is large.

The energy of the additive quantization error differs for the same QP value with the different conditions. Since it is desired to switch at the same quantization error energy, the thresholds $\tau_1$, $\tau_2$, $\tau_3$ need to be different, e.g. as stated above $\tau_1 \geq \tau_2 \geq \tau_3$.

Alternatively or in addition, other thresholds allowing for classification the other signal features such as a block size used for motion compensated prediction, an applied intra-prediction mode, sub-pel position, etc. may be used to decide the size of threshold for the quantization parameter based filter selection and/or selection of the filtering order. Such thresholds may also be signalized, or derived from the information available at both, the encoder and the decoder.

Furthermore, the selection of filters and their order may be performed based on the domain, in which the quantization was performed. Both, the quantization step size as well as the domain, are generally coded and transmitted and thus known to the encoder as well as to the decoder. Both, the quantization step size as well as the domain of quantization may vary from block.

If both domains, which means, for instance, spatial and frequency domain, may be applied for quantization, a use of two individual thresholds on quantization parameter may be of advantage. Both thresholds, a first one for the frequency domain and a second one for the spatial domain, could be coded and transmitted. A prediction error coding in the spatial domain is more efficient than in the frequency domain if the prediction error samples have no statistical dependencies among each other and if the distribution of the prediction error samples in not Gaussian. This is often associated to very small prediction errors and thus to very small quantization errors, especially in the case of coarse quantization. Thus, in order to switch at approximately the same quantization error, the threshold associated to the spatial domain should generally be higher than the threshold associated to the frequency domain.

In order to limit the required bit rate and thus to increase the coding efficiency, the coding of thresholds could be done dependently on each other. For example, a first threshold, e.g. for the spatial domain, could be coded at first. Afterwards, the difference between the first threshold and a second threshold, e.g. for the frequency domain, could be coded, or vide versa. This also applies for the thresholds $\tau_1$, $\tau_2$, and $\tau_3$ and $\tau_{\Delta \vec{d}}$, $\tau_{\vec{d}}$ described above, or any other thresholds derived from the type of coding or values of the block.

It is also possible to define more than two intervals by transmitting additional thresholds. Based on the intervals and the actual quantization step size of a block (QP value), the filters and their order may be selected. The associated selection and the order may also be determined at the encoder, coded, and transmitted. This may include the following coding steps:

Selecting intervals to classify quantization step sizes. This may be done for example by using intervals of equal size. E.g., in the case that 51 different quantization step sizes are possible, the intervals could be [0,9], [10,19], [20,29], [30,39], [40,50].

Coding and transmission of intervals. Coding can be carried out by exploiting the dependencies, for instance, by applying differential coding and/or the entropy coding.

Selecting filters and their order for each of the intervals. Also the position of the filters, which is either in the loop or post-loop, can be selected. This can be done e.g. by minimization of the Lagrangian costs of bit rate and mean squared reconstruction error or by comparing a similarity measure between the original signal and signal filtered with different filters differently ordered and possibly on different positions with respect to the loop.

Coding and transmission of the selected filters, their order, and, if applied, position in the in-loop or post-loop.

Another possibility is to select implicitly an order based on the domain, in which the quantization is performed. In the case that the quantization of the prediction error of the current block has been performed in the spatial domain, it is beneficial to apply a first filter which reduces the noise in the spatial domain. Afterwards, a second filter could be applied, for instance, to reduce the noise in the frequency domain. This noise may be e.g. some noise in the reference images which have been used for prediction. In the case that the quantization of the prediction error of the current block has been performed in the frequency domain, it is beneficial to apply a first filter which reduces the noise in the frequency domain. Afterwards, a second filter could be applied, e.g. to reduce the noise in the spatial domain. This noise may be e.g. some noise in the reference images which have been used for prediction. By having this order, the main noise is reduced first and does thus not hinder the reduction of the other noise as also described with reference for FIG. 5. Thus, the coding efficiency is improved.

In the case that an adaptive quantization domain is used, it is also possible to use both information, the domain of quantization and the quantization step sizes to select whether to reduce the noise in the spatial domain first and afterwards the noise in the frequency domain or the other way around. This may be done as follows:

If the quantization step size associated to the reference frame is larger than the quantization step size of the current quantization step and the quantization domain of the reference frame is the spatial domain and the quantization domain of the current frame is the frequency domain, then the current reconstructed frame contains more additive noise in the spatial domain than in the frequency domain. In this case, a filter reducing the noise in the spatial domain may be selected to be applied before a filter reducing the noise in the frequency domain.

If the quantization step size associated to the reference frame is smaller than the quantization step size of the current quantization step and the quantization domain of the reference frame is the spatial domain and the quantization domain of the current frame is the frequency domain, then the current reconstructed frame contains more additive noise in the frequency domain than in the spatial domain. In this case, a filter reducing the noise in the frequency domain may be selected to be applied before a filter reducing the noise in the spatial domain.

If the quantization step size associated to the reference frame is larger than the quantization step size of the current quantization step and the quantization domain of the reference frame is the frequency domain and the quantization domain of the current frame is the spatial domain, then the current reconstructed frame contains more additive noise in the frequency domain than in the spatial domain. In this case, a filter reducing the noise in the frequency domain may be selected to be applied before a filter reducing the noise in the spatial domain.

If the quantization step size associated to the reference frame is smaller than the quantization step size of the current quantization step and the quantization domain of the reference frame is the frequency domain and the quantization domain of the current frame is the spatial domain, then the current reconstructed frame contains more additive noise in the spatial domain than in the frequency domain. In this case, a filter reducing the noise in the spatial domain may be selected to be applied before a filter reducing the noise in the frequency domain.

If the quantization domain of the reference frame is the same as the quantization domain of the current frame, only one filter reducing the noise in the same domain as the quantization was performed in may be selected.

Figure 9:
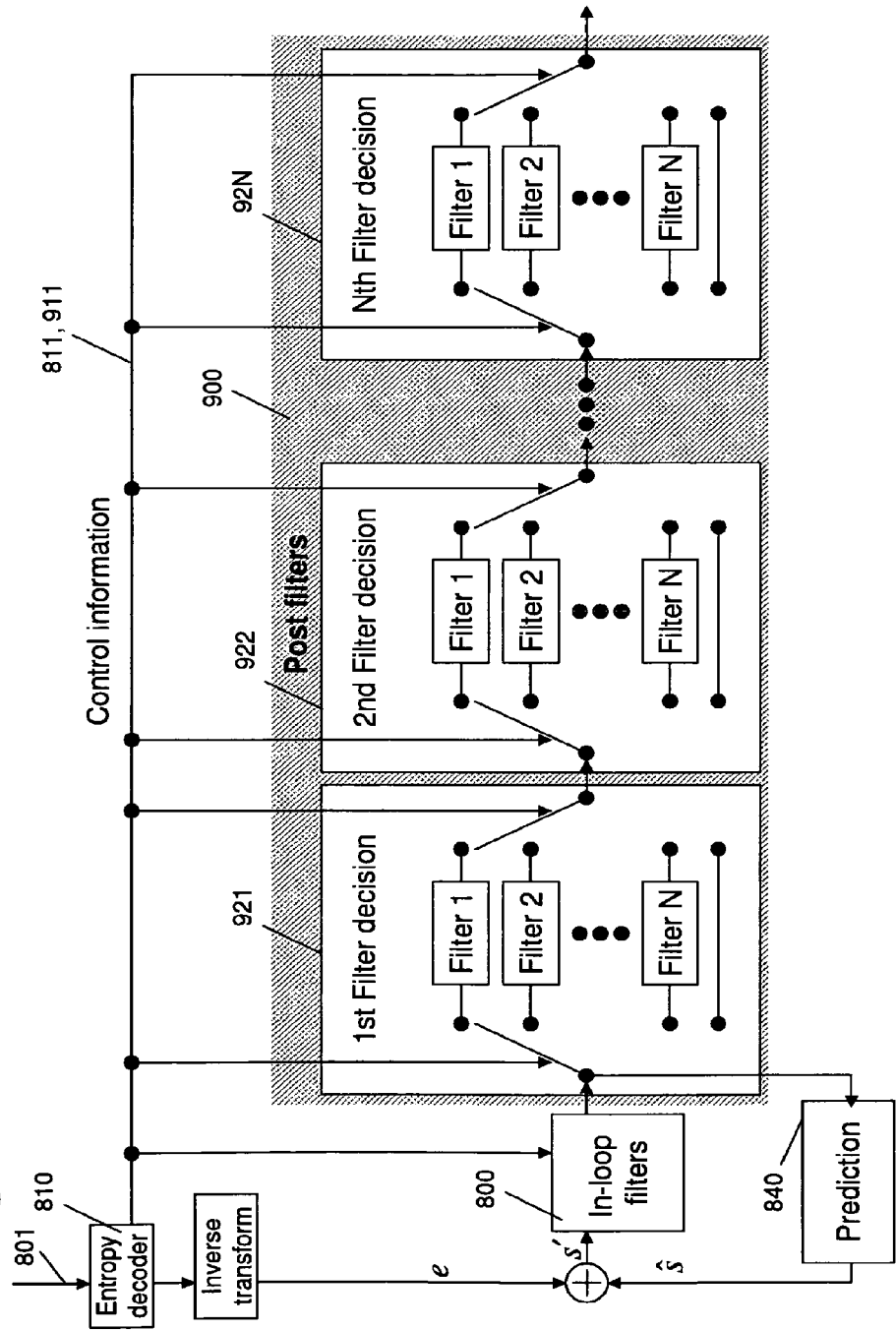
FIG. 9 is a block diagram illustrating an example of a decoder supporting selection of order of post filters in accordance with another embodiment of the present invention.

The selection of the filters, the filtering order and the filter position is shown in more detail in FIG. 9. The decoder illustrated in FIGS. 8 and 9 obtains the control information 811 and/or 911 from the bit stream. This control information may advantageously directly indicate the position of the switches. This may be achieved, for instance by signalling for each switch an indicator 851, 852, etc., each indicator indicating a number between 0 and N, corresponding to the position of the particular switch. In this way, at the same time, the sequence of applying the filters and the filter selection is signalled. However, the present invention is not limited thereto and in general the sequence of applying the filters may also be selected at the decoder implicitly in the same way as at the encoder. This may be based as shown above, for instance, on one or more encoding parameters different from the control information 811 and/or 911, such as a quantization step and/or selected filters and/or a domain in which the image signal is coded etc. The filtering order selection may alternatively or in addition be based on the statistics of the input signal to be encoded, in particular, based on the characteristics of its noise. The statistics or the input image noise may be obtained, for instance, explicitly, by signalling it to the decoder. For instance, it may be signalled whether an additive or multiplicative noise is included in the original image. Alternatively, an image source indicator may be provided to signal, for instance, the type of the input image (for instance one of celluloid film image, SAR image, camera image, etc.).

FIG. 9 illustrates details of post filtering 900 including a plurality of filtering stages 921, 922, . . . , 92N. At each of the plurality of filtering stages, one of N filters or no filter may be selected. The effect of this scheme is similar to a selection of the order of applying filter 1, to filter N or no filter as discussed above for the in-loop filter(s).

In order to maximise the coding efficiency, the selection of the sequence for applying the filters is preferably selected by testing each possible filter order, and by choosing the filter order that minimises Lagrangian costs of mean square reconstruction error and bit rate. In such a case, the knowledge of the original image is necessary. In case when the input noise should be preserved, the Lagrangian costs optimization provides optimization may be performed with respect to the noisy original signal.

An alternative optimization that may be applied in order to improve the coding efficiency is based on a predefined similarity/dissimilarity metric. In particular, a similarity or dissimilarity between the original image (including input noise) and the reconstructed image may be calculated for different sequences of applying the filters. Then, the filtering order leading to the highest similarity or, equivalently, to the lowest dissimilarity, may be selected. For example, as a similarity measure, the correlation or covariance may be used. As a dissimilarity measure, for instance, a sum of absolute differences, mean square error, or any other measure/metric based on pixel differences may be applied.

It should be noted that even if the original noise is desirable in the reconstructed image signal, for the purposes of motion estimation it may be beneficial to store an image with the reduced original noise. Thus, for the purpose of storing the reference frames, the filtered images may be taken, wherein for the purpose of outputting the reconstructed signal it may be preferable to skip the filtering for suppressing the input noise. In general, for reference image storing it is advantageous to reduce by filtering the noise which is uncorrelated in time, since if not removed/reduced, it may reduce the efficiency of motion vector search. In particular, the noise in a block in frame number m may contain different input image noise than its corresponding block in a previous frame number m-j, which makes it difficult to find the best matching block. An example of temporally uncorrelated noise may be a camera noise such as PCM noise. On the other hand, if the input image noise is temporally correlated, it may be beneficial not to suppress it in order to improve the motion compensated prediction.

The selection of the sequence for applying different filters during the encoding and/or decoding process may be performed adaptively during an image coding or during a video coding. The selection of filters and/or the filtering order is preferably performed for each block of an image. This provides high flexibility and enables increasing the efficiency of the coding adaptively for blocks to which also different encoding settings may be applied. However, when the selection of filtering order and/or the filters is performed on a block basis and a filter sequence indicator is explicitly signalled, this may increase the signalling load. In order to keep the signalling overheads low, the filter sequence indicators may be further encoded. For instance, predictive coding which encodes differences between the filter sequence indicators of neighbouring blocks in the spatial and/or in the temporal domain may be employed. Alternatively, or in addition, the filter sequence indicators may be encoded by an entropy code, such as a Golomb code, an exponential Golomb code, unary code, Elias code, Huffman code, etc.

Another possibility for keeping the signalling overheads low is selecting the order of filtering for a plurality of macroblocks such as slices in a video sequence or for an entire image. The selection of filters and the filtering orders may also be performed once per/for several images (frames) in a video sequence, for instance, once for each group of pictures.

The present invention is also applicable for filters with more than one input. Various examples for different sequences of applying filters including such a filter are shown in FIGS. 10, 11, 12, and 13. Accordingly, a plurality of the prediction signal, the quantized prediction error signal and/or the decoded signal are considered separately for the filter design. This allows the consideration of noise of each of these three signals individually. For instance, the post filter coefficients may be calculated at the encoder side based on the input signal, decoded signal after applying the deblocking filter, prediction signal and quantized prediction error signal. Similarly, an in-loop filter may be designed considering the above separate signals. The calculation of coefficients may be done by calculating the Wiener filter. The filter coefficients or an information, allowing for calculating the filter coefficients at the decoder side such as cross-correlation between the original and the reconstructed video signal, is further included into the bitstream comprising the encoded video signal.

Figure 10:
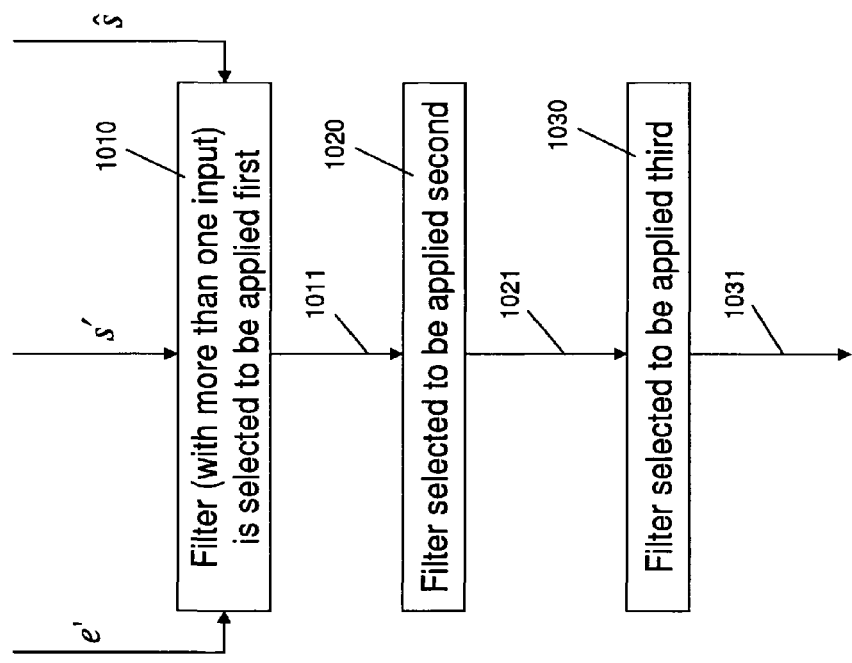
FIG. 10 is a schematic drawing illustrating cascading of filters in which the filter with more than one input is applied as the first filter.

FIG. 10 illustrates an example in which a filter with more than one input signals is selected to be applied in the first filtering stage. In this example, the first filter 1010 has three inputs: the quantized prediction error signal e', the prediction signals and the reconstructed signal s'. The filter separately filters the above signals and outputs a single signal 1011 obtained by combining the separately filtered signals, for instance as their linear combination. The signal 1011 filtered at the first filtering stage 1010 (which may be seen as a respective coding or decoding stage) is then input to a second filtering stage 1020 of filtering by a filter selected to be applied as the second filter. The output of filtering 1021 is then inputted to a third filtering stage 1030, at which the signal 1021 is further filtered by a filter selected as the third filter. The resulting filtered signal 1031 may be output or stored or further processed.

Figure 11:
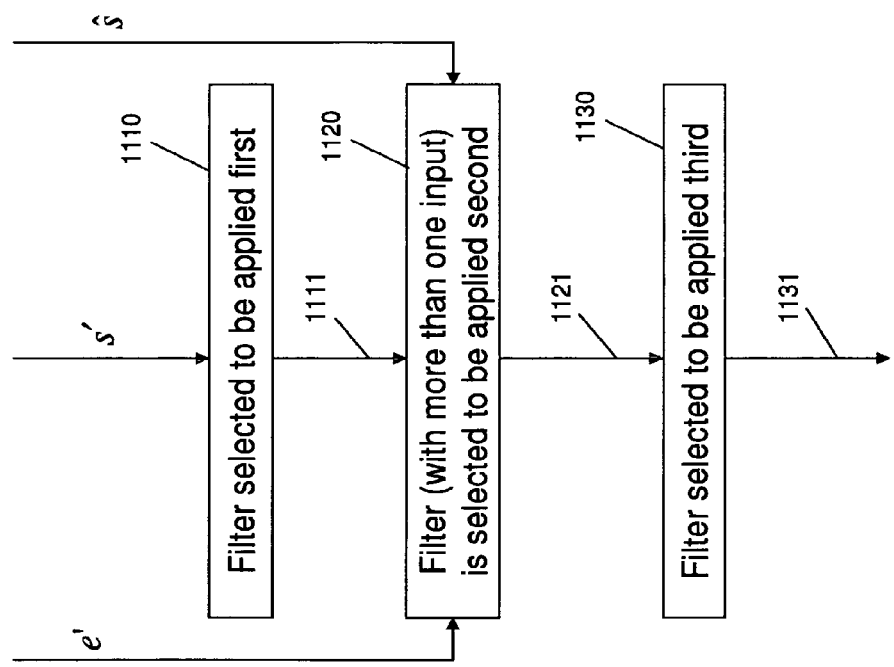
FIG. 11 is a schematic drawing illustrating another example in which the filter with more than one input is applied as a second filter and only one of its inputs is filtered.

FIG. 11 shows the case, in which the filter 1120 with more than one input is selected to be applied as a second. This may be implemented by filtering first the reconstructed video signal s' at a first filtering stage 1110 and to input the filtered signal 1111 to the second stage 1120 of filtering with the filter having more than one input, the additional inputs being the quantized prediction error signal e' and the prediction signal Ss. The resulting filtered reconstructed video signal 1121 is then input to the second stage of filtering 1130 at which it is filtered by a filter selected as the third to be applied. The resulting signal 1131 filtered at all three stages may then be output or stored or further processed. In this example, only the reconstructed signal s' is filtered at the first stage 1110 and the remaining signals e' and ŝ are input directly to the second stage.

Figure 12:
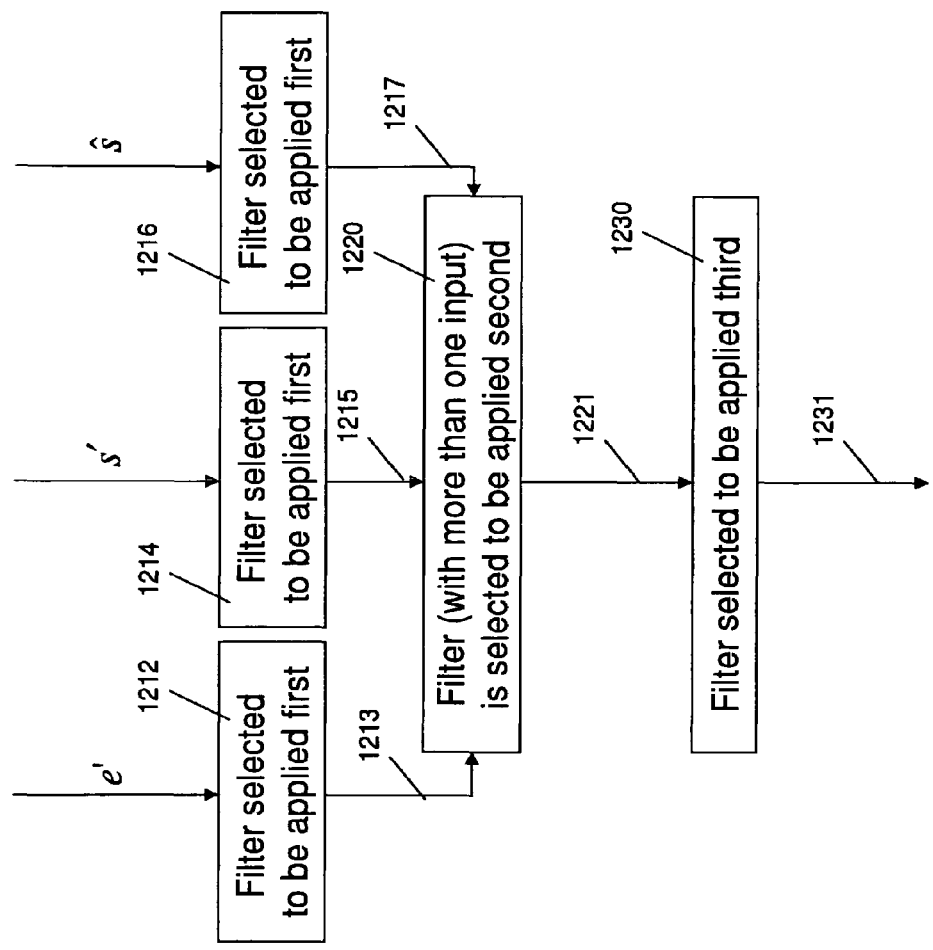
FIG. 12 is a schematic drawing illustrating an example in which the filter with more than one input is applied as a second filter and each of its inputs is separately filtered.

FIG. 12 illustrates another alternative of filtering in the case in which the filter 1220 with more than one input is selected to be applied as a second. Each of the input signals e', s', and ŝ is filtered at a first filtering stage by a separate filter 1212 (for filtering e'), 1214 (for filtering s') and 1216 (for filtering ŝ). The separately in the first stage filtered resulting signals 1213, 1215, and 1217 are then input to the second stage filter 1220 with more inputs and filtered to obtain the resulting reconstructed video signal 1221, which is then further filtered at the third stage 1230 by a filter selected to be applied as the third. The resulting signal 1231 filtered at all three stages may then be output, stored or further processed. In this example, thus, for the first stage three different filters 1212, 1214, and 1216 are selected. These filters may be different or (partially) equal to each other. Accordingly, the three filters at the first filtering may be selected separately, and thus, may be adapted individually to the characteristics of the different input signals. This may lead to a further improvement of the filtering results.

Figure 13:
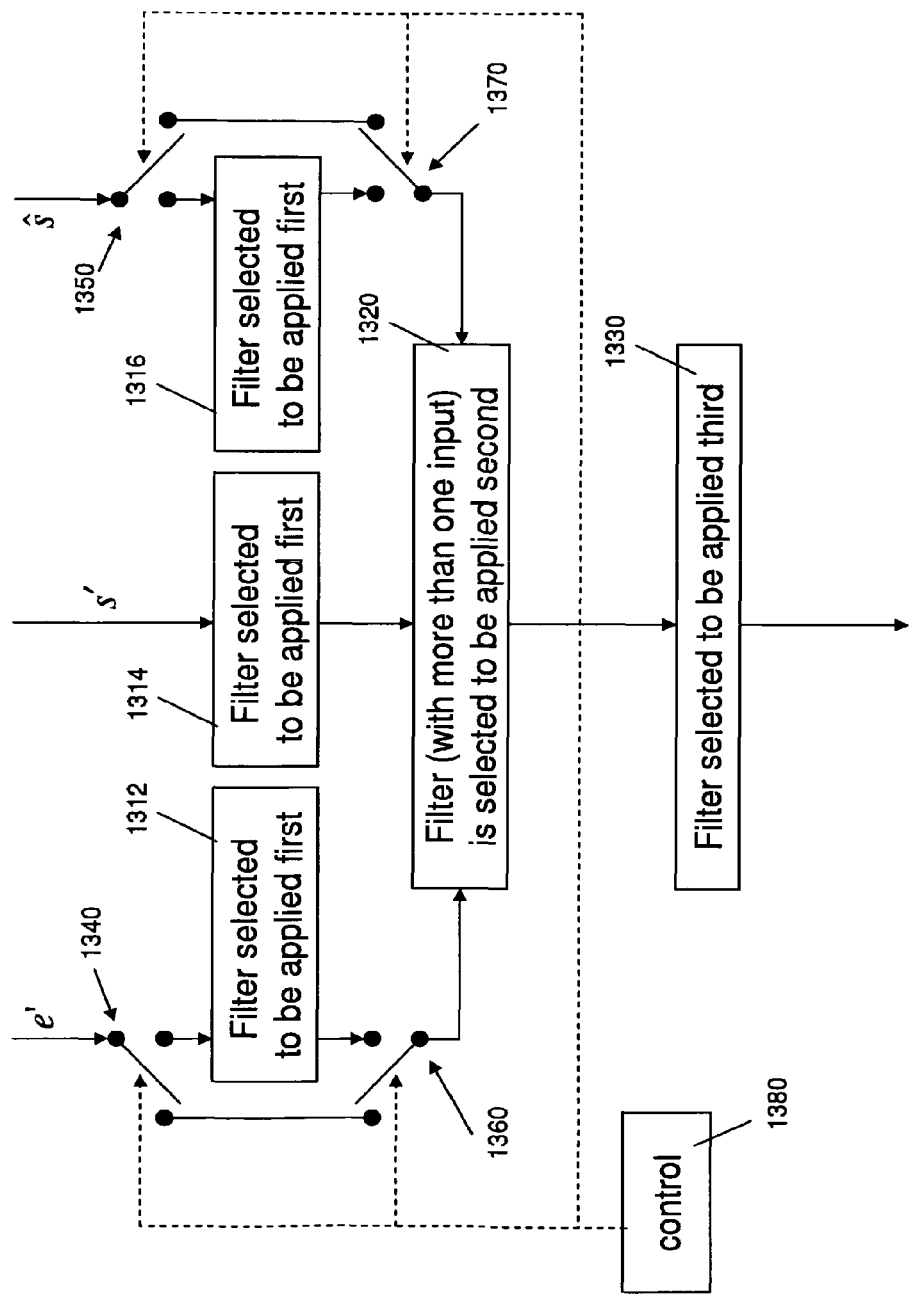
FIG. 13 is a schematic drawing illustrating an example of filtering in which the filter with more than one input is applied as a second filter, each of its inputs is filtered separately and the order of applying the first and the second filter to particular input may be selected.

FIG. 13 illustrates still another alternative for the case in which the filter 1320 with more than one input is employed at the second filtering stage. According to this example, switches 1340, 1350, 1360, and 1370 enable individually controlling 1380 whether a separate filter 1312 and/or 1316 shall be applied at the first stage or not. The switches 1340 and 1360 are coupled and may be switched together (either both closed or both open). Similarly, the switches 1350 and 1370 are coupled. A similar switch may also be provided for enabling/disabling filtering at the first stage of the reconstructed video signal s'. After the first stage filtering the selected one(s) of the input signals e', s', and/or ŝ, the filtered signal is input to the third stage filter 1330. Preferably, the control of the switches 1340, 1360, 1350 and 1370 is performed by a control unit 1380 at the encoder side, where the position of the switches may be set by the user and/or derived from any data available at the encoder. If the position of switches is also determined at the encoder based on a signal which is not available at the decoder, this position of switches or information necessary for determining it may be signalled within the bitstream. The switches 1340, 1360, 1350 and 1370 may alternatively be set to a fixed position as a part of the encoder settings for the entire sequence.

Figure 14:
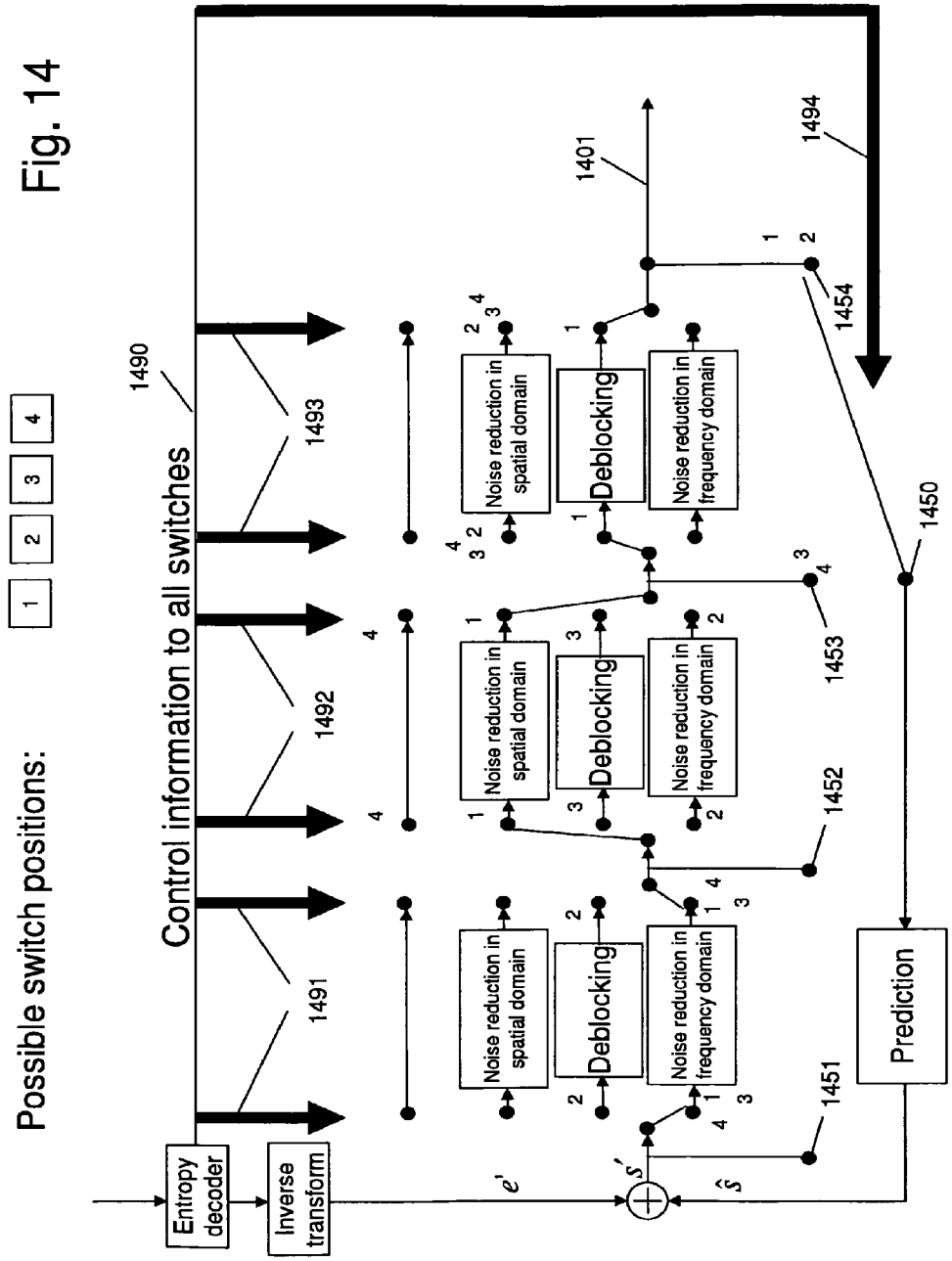
FIG. 14 is a block diagram illustrating an example of filter selection and filter order selection in accordance with the present invention.

FIG. 14 is a block diagram illustrating another embodiment of the present invention. In this embodiment, the order of three types of filters may be selected: a noise reducing filter in spatial domain, a noise reducing filter in frequency domain, a deblocking filter. The filters and their order of application are selected by means of control information 1490 obtained from the entropy decoder where it is extracted from the bitstream. In particular, the control information 1490 indicates the selection 1491, 1492, and 1493 of filters in any of the three stages as well as a selection 1494 of the position of each of these three stages either in the loop or after the loop. Each of control information 1491, 1492, and 1493 advantageously enables at each of the three filtering stages a selection of either the noise reducing filter in spatial domain, the noise reducing filter in frequency domain, the deblocking filter, or no filter. Thus, for instance, each of control information 1491, 1492, and 1493 may be a two-bit indicator signalling the position of switches at each respective filtering stage. Such three indicators embedded within the bitstream in fixed predefined order signal at the same time the selection of filters and their order of application.

However, the present invention is not limited to such a signalling. Another advantageous example of controlling the order of filter application as well as the selection of filters in FIG. 14 is to enable signalling of only a predefined number of configurations. For instance, FIG. 14 illustrates a case where only four different combinations of setting the switches are possible, the possible combinations being marked by numbers 1, 2, 3, and 4 indicated in the proximity of each filter selection switch. In particular, as can be seen in FIG. 14, combination 1 corresponds to applying at the first stage the noise reduction in frequency domain, at the second stage the noise reduction in the spatial domain and at the third stage the deblocking filter. The combination 2 corresponds to applying at the first stage the deblocking filter, at the second stage the noise reducing filter in frequency domain and at the third stage the noise reduction filter in spatial domain. The combination 3 corresponds to applying at the first stage the noise reduction filter in the frequency domain, at the second stage the deblocking filter and at the third stage the noise reducing filter in spatial domain.

Finally, the fourth combination corresponds to applying at the first stage the noise reducing filter in frequency domain, at the second stage no filter at all, and at the third stage the noise reducing filter in spatial domain. These four combinations are obviously only examples. More combinations may be enabled and signalled. The signalling may be implemented by a single common codeword assigned to each combination. The assignment of codeword length may be done according to the probability of occurrence of the combination, which means that the combinations may be coded (binarized) using a variable length code (an entropy code).

The control information 1490 in this example further includes position indicator 1494 for indicating which of the three filtering stages are performed in-loop and which of them are performed post-loop. In particular, the position indicator 1494 controls a switch 1450 which may take one of four positions 1451, 1452, 1453, and 1454. When the switch 1450 is in the position 1451, then all three filtering stages are performed post-loop. In other words, the three stages represent a post-filtering and their result is not stored in the memory and used for prediction. When the switch 1450 is in the position 1452, then the first filtering stage is in the loop and its result is stored in the memory for the prediction. However, the second and third filtering stages are performed as post-filtering influencing only the decoder output signal. Moreover, when the switch 1450 is in the position 1453, the first two stages are performed in-loop and only the third stage is performed post-loop. Finally, position 1454 of the switch 1450 indicates that all three filtering stages are performed in the loop and their result is stored in the memory and utilized for prediction.

The position indicator 1494 may be encoded separately from the switch positions for filter selection (which may be encoded as a combination or individually as described above). However, the position indicator 1494 may also be a part of a combination of filter selection switches and the position indicator. Only a limited number of combinations may be enabled. For instance, as can be seen in FIG. 14, in this example, only two positions of the switch 1450 are allowed, namely, position 1453 and 1454. In particular, the position 1453 belongs to a combination 3 or 4 described above for selection of filters, and the position 1454 belongs to a combination 1 or 2. However, these are only examples and other advantageous combinations may be enabled.

Summarizing, FIG. 14 illustrates an example in which:
control information 1491, 1492, and 1493 controls the selection and the order of application of three possible filters at three possible filtering stages of image signal representations during decoding, and
control information 1494 controls the position of the filter with respect to the decoding loop, in particular, which of the three filtering stages are performed in-loop and which of them are performed post-loop.

In general, there may be more than three stages; there may also be only two filtering stages. The implementation of such cases is straight forward by reducing or increasing the number of filter selection switches switches (cf. FIGS. 8 and 9) and/or the number of possible positions of the position selection switch 1450.

In this example, four different filter types are possible to select: a deblocking filter, a noise reduction filter in spatial domain, a noise reduction filter in frequency domain or no filter. However, the present invention is not limited thereto and a selection of various types of noise reduction filters in frequency and/or spatial domain as well as deblocking filters may employed. It is also possible to employ filters in temporal domain (filtering over a plurality of frames). Furthermore, any of these example filter types may be implemented either as a filter with fixed coefficients, or as an adaptive filter. For instance, the noise reduction filter in spatial domain may be implemented as a Wiener filter with one or more inputs. However, the noise reduction filter may also be a filter with fixed coefficients such as a median filter, or any other filter. The noise reduction filter in frequency domain may also be implemented as a Wiener filter with one or more inputs. However, it may also have fixed coefficients, or it may allow a selection from a plurality of sets of predefined filter coefficients. Similarly, the deblocking filter may be an adaptive filter, for instance Wiener filter, or a fixed filter. All these filter types may be one-dimensional separable including two stages: vertical filtering stage and horizontal filtering stage, the application order of which may also be selected in accordance with the present invention. Any of the filters may also be two-dimensional non-separable.

In this embodiment, the output signal 1401 is always the signal after all three stages (even if at some stages no filter may be switched). It is not possible, for instance, to output signal which has not been filtered in-loop. However, it may be beneficial to filter the in-loop signal using additional filters while outputting a signal without application of that filters or a part of them. In order to allow such configurations, according to another embodiment of the present invention another switch is added to the filtering scheme of FIG. 14.

Figure 15:
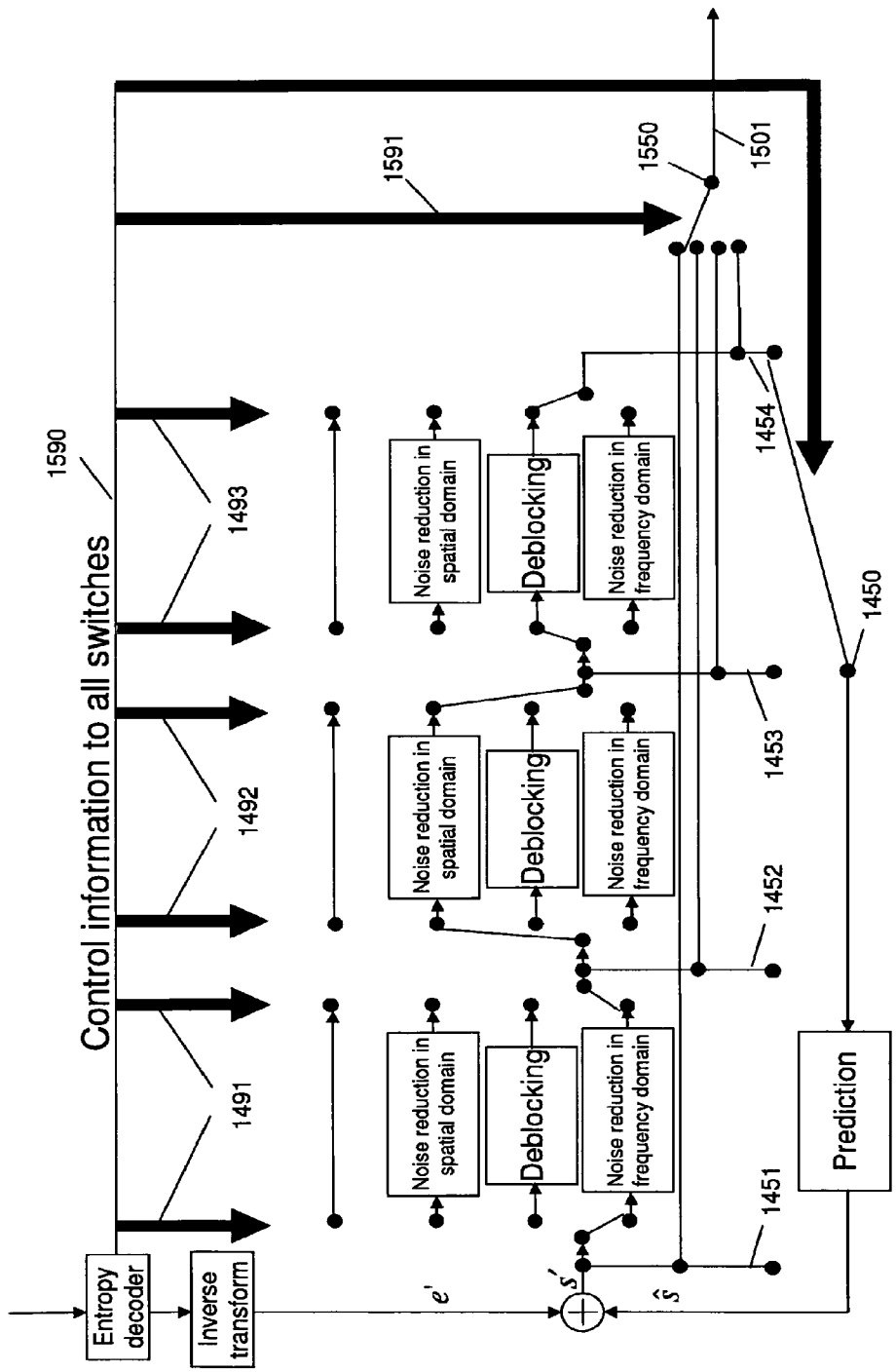
FIG. 15 is a block diagram illustrating another example of filter selection and filter order selection in accordance with the present invention.

FIG. 15 illustrates such a switch 1550 controlled by control information 1591. The output selection switch 1550 The output selection control information 1591 is a part of the control information 1590 which may further comprise the filter selection control information 1490 possibly including also the position selection information 1494. The output selection control information 1591 may be encoded as a separate codeword or as a part of a combination with of the filter selection indicators 1491, 1492, and 1493 and/or the position indicator 1494. The switch 1550 allows switching between four possible positions. In particular, position of the switch 1550 specifies at which stage 1451, 1452, 1453, or 1454 of filtering the signal 1501 is output from the decoder. Thus, it is possible, for instance, to output the signal 1501 even before the first stage 1451 of filtering, and at the same time apply in-loop filtering in one or more stages. One of the in-loop stage filters may also be an interpolation filter.

Figure 16:
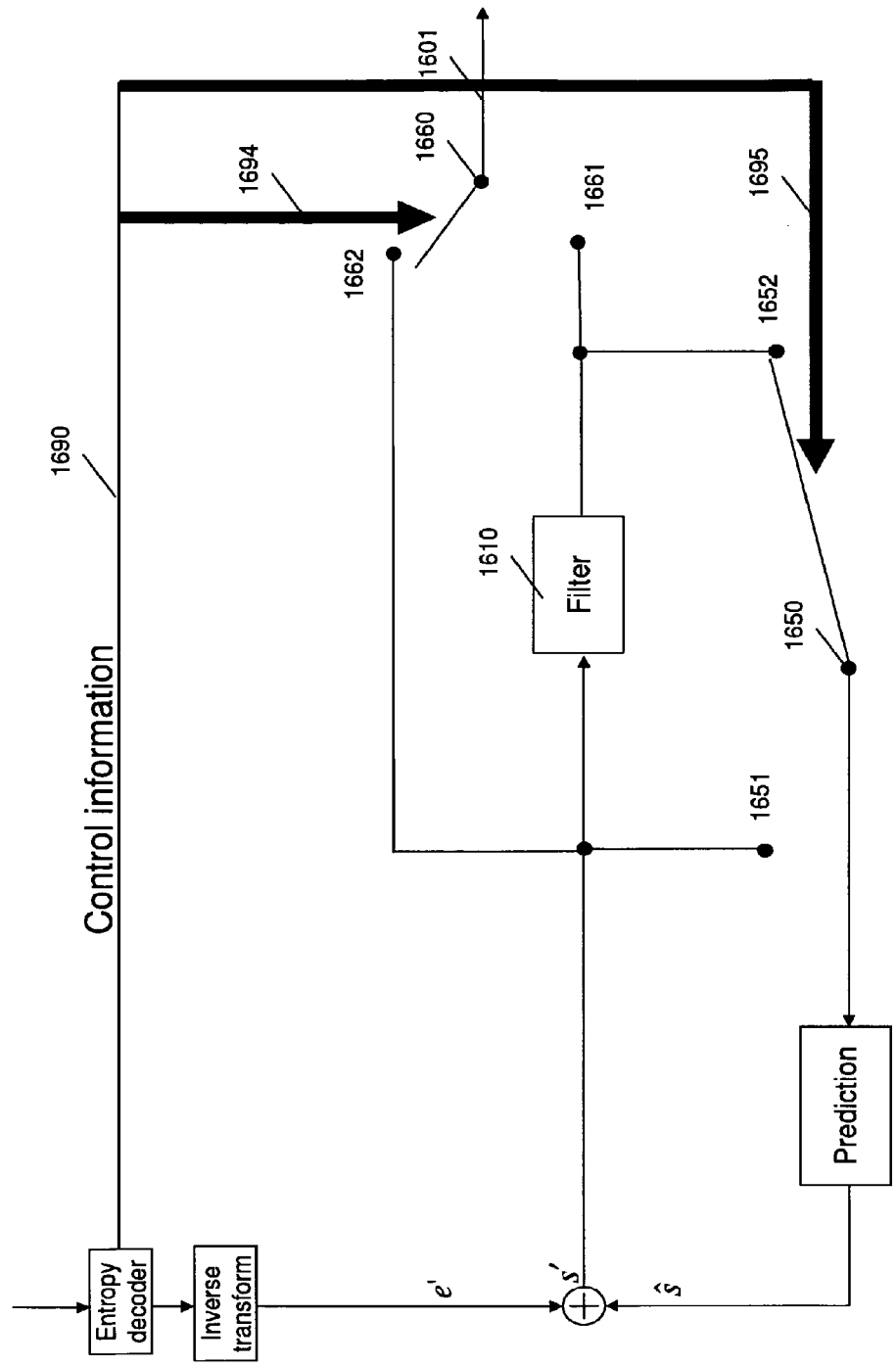
FIG. 16 is a block diagram illustrating still another example of filter selection and filter order selection in accordance with the present invention.

In general, the selection of the position of a filter in different decoding stages may also be realized for a single filter. The same is true for selection of the output signal from different decoding stages. FIG. 16 illustrates the use of two configurable switches for the case of a single filter. The two switches are "post filter/inloop filter" and "use filtered/not filtered image for output". In particular, the position of a filter 1610 may be selected according to an indicator from the bitstream. The selection may be performed with a switch 1650 controlled b a position selection indicator 1694 included within control information 1690 which may further include the output selection indicator 1695 for controlling a switch 1660. The position of the switch 1650 determines whether the filter 1610 is to be employed as an in-loop filter (cf. position 1652) or as a post-filter (cf. position 1651). The position of switch 1660 determines whether the output signal 1601 is a filtered signal after filtering with the filter 1610 (cf. position 1661) or an unfiltered signal (cf. position 1662). In addition, filter coefficients or other information for setting up the filter 1610 may be signalled within the control information 1690. The control information may indicate the position of the switches. In this simplified example a one bit filter position information 1694 could be signalled and/or a one bit output selection information. The switches 1650 and 1660 may be implemented in hardware or software for instance by means of a condition depending on the control information.

FIG. 17 illustrates an example of method steps to be performed to employ the present invention. The encoding method 1700A includes a step 1710 of selecting the sequence of application of at least two filters. Here, the selection may be performed by the user my means of setting encoding parameters such as control information for controlling switches shown in any of FIGS. 5 to 9 or 13 to 16. However, the selection may also be performed based on other encoding parameters and/or based on the input image signal or its representation (its quantized and/or transformed version, its prediction error or predictions signal, etc.). The encoding parameters according to which the selection may take place may be, for instance, type of prediction, domain of quantization, quantization parameter, motion vectors, size of block, etc. The selection of the filter order may be performed, for instance, per block or per slice or per frame or per a predefined number of frames or per sequence. The at least two filters may be filters to be employed as two decoding stages. The at least two filters may be all in the loop, all post loop, or at least one of them in the loop and at least one of post loop. The position within/out of the loop may also be selectable as a part of selecting the order of filtering. Moreover, the filter order selection may also include the selection of particular type of filters and/or filters.

After the filtering-order selection, the image signal for which the filtering order has been selected is encoded 1720 including filtering before and/or during and/or after the encoding. In particular, the filtering may be employed before/after different stages of the encoding: after quantizing in frequency domain, after quantizing in spatial domain, or after image signal reconstruction. Here, before/after a single encoding step, a plurality of filtering stages may be employed immediately after each other as separate encoding stages, the order of these filter being selected according to the present invention. Alternatively, or in addition, the ordering of filters before/after different encoding stages may be performed, for instance, it may be selected whether deblocking filter and/or noise reduction filter is applied in-loop and/or post-loop and which of them is applied as first and which of them as a second filter.

The encoded and filtered image signal is embedded 1730 into the bitstream, into which further a control information may be embedded such as filter-sequence indicator for indicating the filtering order and/or filter selection indicator indicating filtering order and filters to be applied. The control information may also include position indicator for indicating at which decoding stage and/or filtering stage a filter is to be applied or an indicator indicating at which of the decoding and/or filtering stage the image has to be output. The bitstream is then output from the encoder. The bitstream may be stored or transmitted 1790.

A bitstream 1790 such the bitstream generated by the encoding method described above may be decoded. The decoding 1700B method according to the present invention may include a step of parsing 1750 of the bitstream. During parsing, the information elements indicating encoded image data are extracted and, possibly, a control information for supporting the selection of the filtering order and/or at least one filter and/or filter position with respect to the decoding loop and/or decoding stage at which the decoded signal is to be output.

In accordance with the parsed information elements, the filtering order of at least two filters and or a position of a filter and/or the filter and/or the stage of the output signal is selected 1760. In particular, the filtering order may be selected in accordance with the control information dedicated to selecting the filtering order, such as positions of switches as shown in FIGS. 5 to 9 or 13 to 16. However, the filtering order may also be selected based on information elements including other encoder parameters such as quantization parameter, domain of quantization, size of blocks, type of prediction, motion vectors, or information elements containing the encoded image signal, or any other information extracted from the bitstream.

After the filtering order has been selected, the bitstream is decoded and during the decoding, the possibly selected filters are applied 1770 in the selected order and/or on the selected positions. The decoded and filtered image signal is then output 1780.

FIG. 18 illustrates a generalized example of system for transferring encoded video data from an encoder side to a decoder side in accordance with the present invention. An input video signal is encoded by a transmitter 1801 and provided to a channel 1802. The transmitter 1801 is an encoder in accordance with any of the embodiments of the present invention as described above. The channel 1802 is either storage or any transmission channel. The storage may be, for instance, any volatile or non-volatile memory, any magnetic or optical medium, a mass-storage, etc. The transmission channel may be formed by physical resources of any transmission system, wireless or wired, fixed or mobile, such as xDSL, ISDN, WLAN, GPRS, UMTS, Internet, or any standardized or proprietary system. Apart from the encoder, the encoder side may also include preprocessing of the input video signal such as format conversion and/or transmitter for transmitting the encoded video signal over the channel 1802 or an application for transferring the encoded video signal into the storage. The encoded video signal is then obtained from the channel 1802 by a receiver 1803. The receiver 1803 is a decoder in accordance with any embodiment of the present invention as described above. The decoder decodes the encoded video signal. Apart from the decoder, the decoder side may further include a receiver for receiving the encoded video signal from a transmission channel, or an application for extracting the encoded video data from the storage, and/or post-processing means for post processing of the decoded video signal, such as format conversion.

The processing described in each of embodiments can be simply implemented in an independent computer system, by recording, in a recording medium, a program for implementing the configurations of the video coding method and the video decoding method described in each of embodiments. The recording media may be any recording media as long as the program can be recorded, such as a magnetic disk, an optical disk, a magnetic optical disk, an IC card, and a semiconductor memory.

Hereinafter, the applications to the video coding method and the video decoding method described in each of embodiments and systems using thereof will be described.

Figure 19:
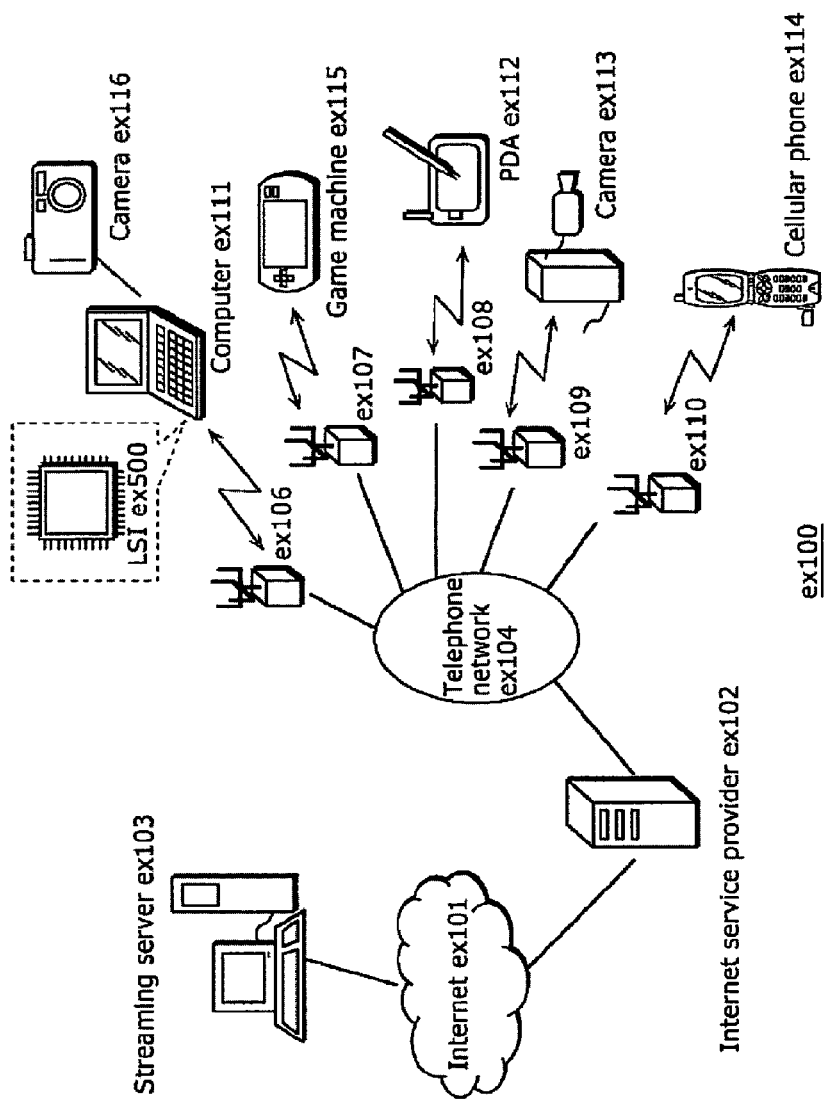
FIG. 19 is a schematic drawing illustrating an overall configuration of a content providing system for implementing content distribution services.

FIG. 19 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 19, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 20:
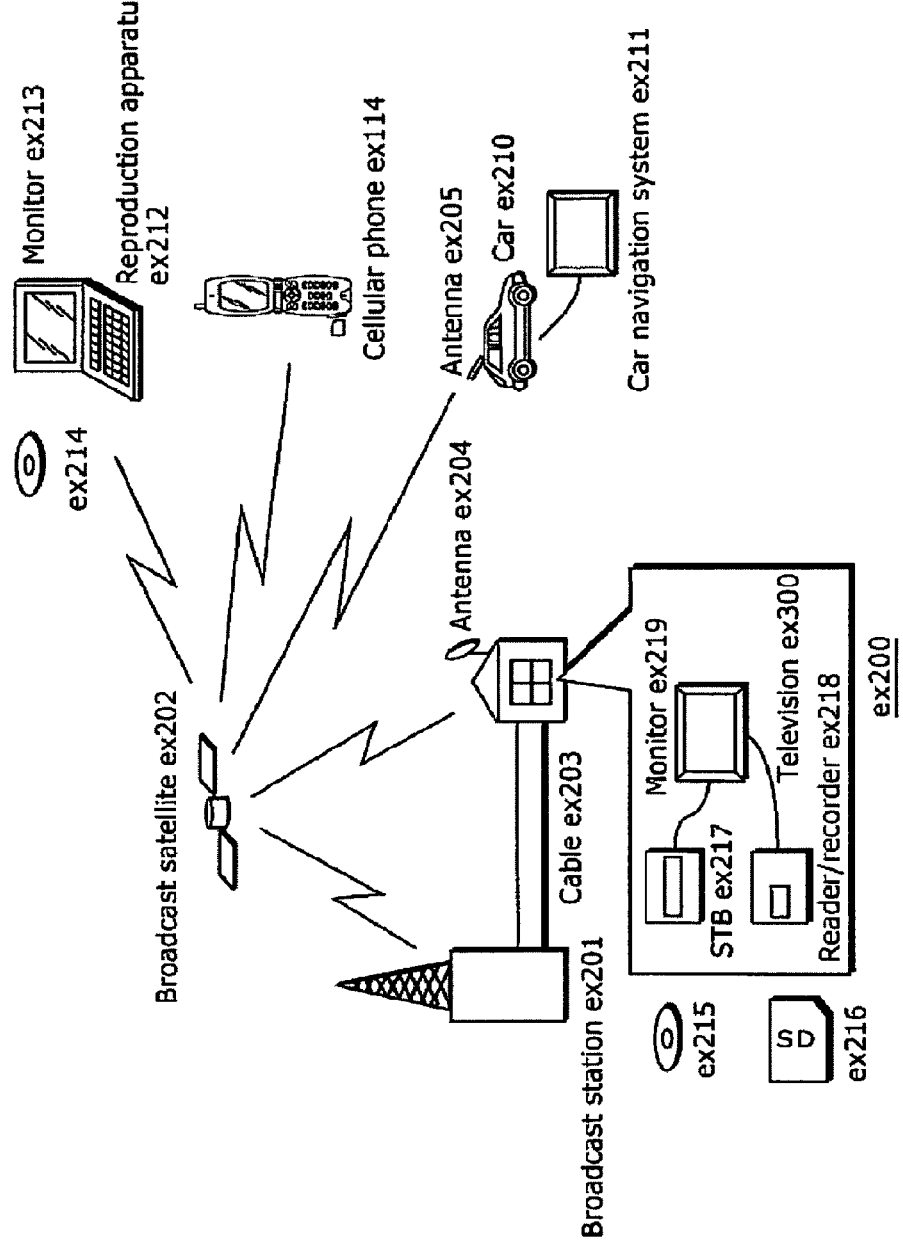
FIG. 20 is a schematic drawing illustrating an overall configuration of a digital broadcasting system.

Aside from the example of the content providing system ex100, at least one of the video coding apparatus and the video decoding apparatus described in each of embodiments may be implemented in a digital broadcasting system ex200 illustrated in FIG. 20. More specifically, a broadcast station ex201 communicates or transmits, via radio waves to a broadcast satellite ex202, multiplexed data obtained by multiplexing audio data and others onto video data. The video data is data coded by the video coding method described in each of embodiments. Upon receipt of the multiplexed data, the broadcast satellite ex202 transmits radio waves for broadcasting. Then, a home-use antenna ex204 with a satellite broadcast reception function receives the radio waves.

Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the video decoding apparatus or the video coding apparatus as shown in each of embodiments. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

Figure 21:
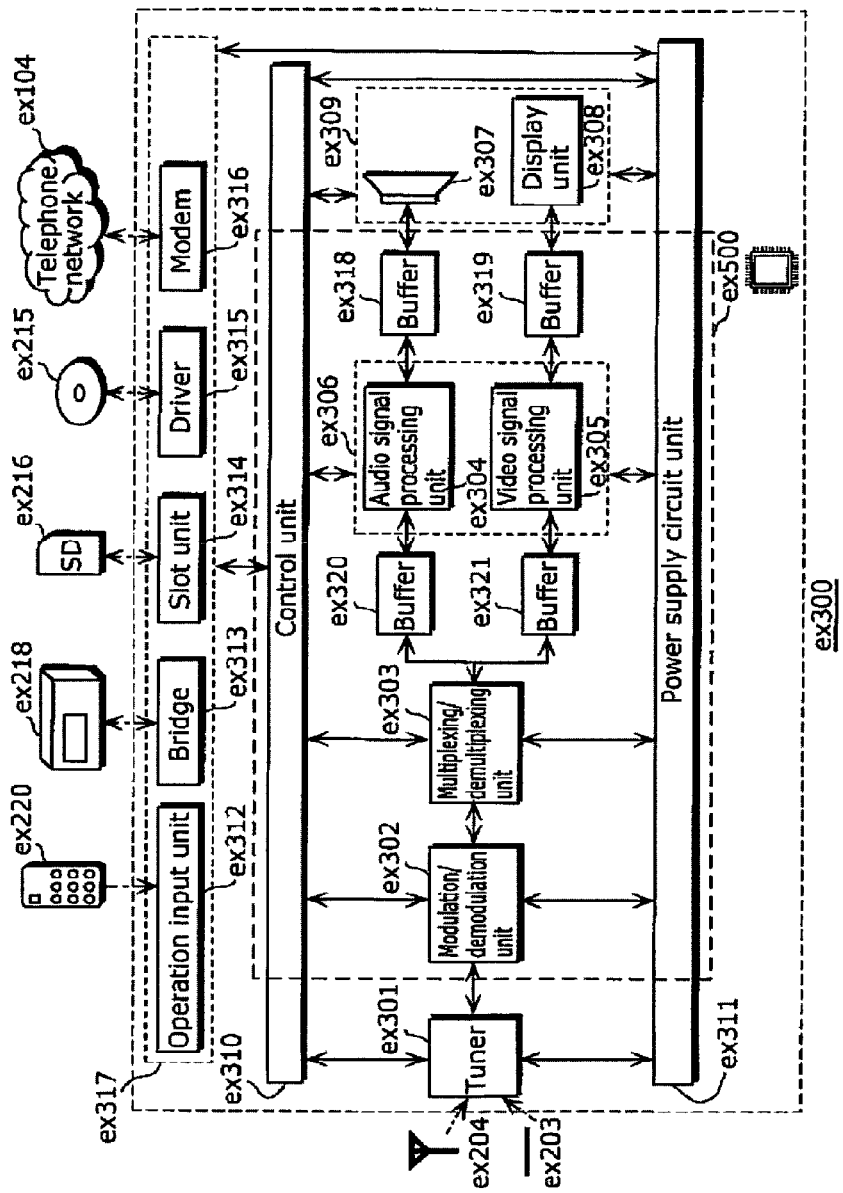
FIG. 21 is a block diagram illustrating an example of a configuration of a television.

FIG. 21 illustrates the television (receiver) ex300 that uses the video coding method and the video decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 22:
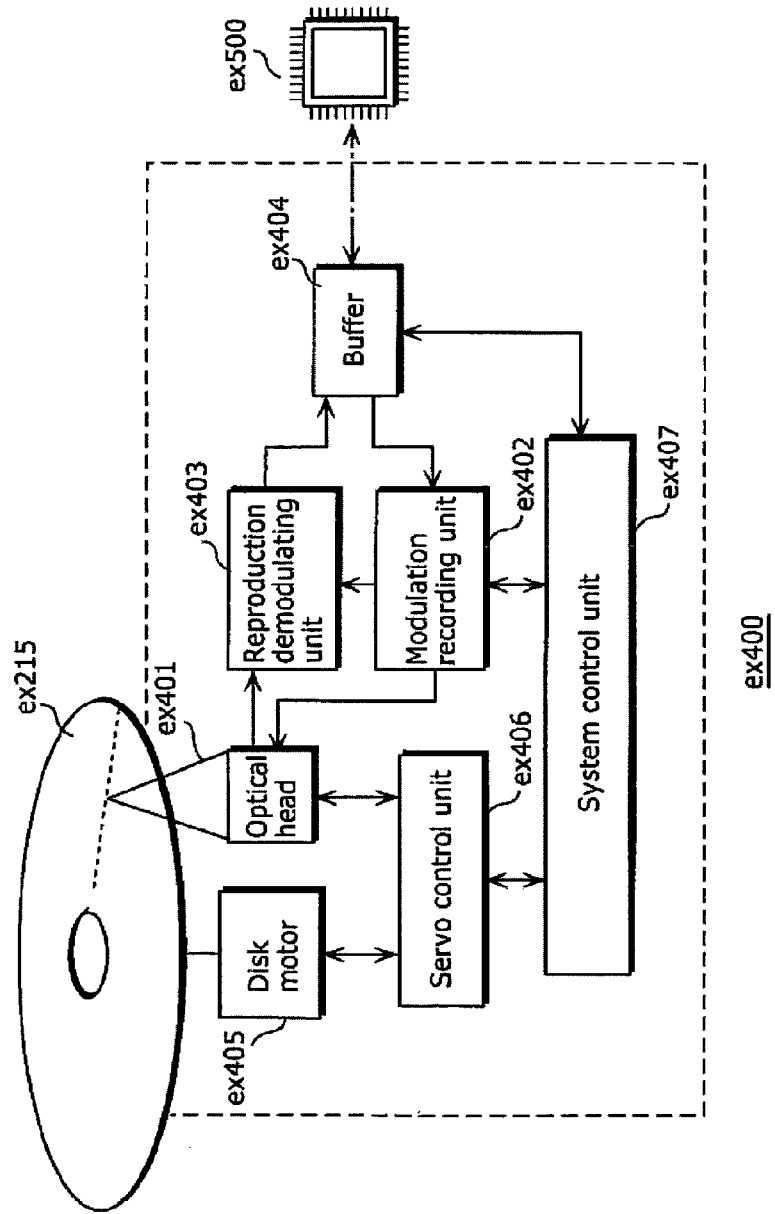
FIG. 22 is a block diagram illustrating an example of a configuration of an information reproducing/recording unit that reads and writes information from or on a recording medium that is an optical disk.

As an example, FIG. 22 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 23:
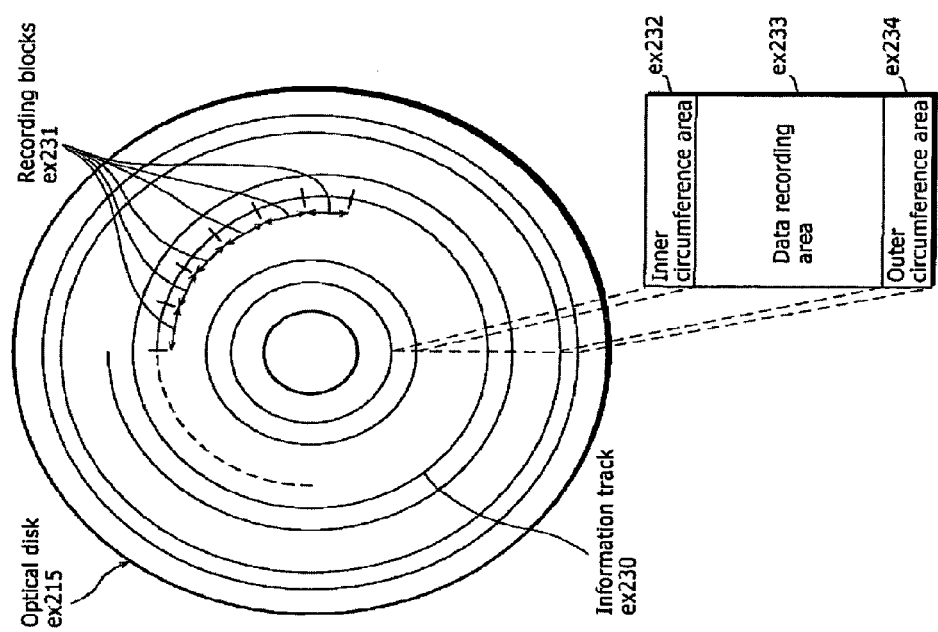
FIG. 23 is a schematic drawing showing an example of a configuration of a recording medium that is an optical disk.

FIG. 23 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information repro- ducing/recording unit 400 reads and writes coded audio, coded video data, or multiplexed data obtained by multi- plexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/repro- duction, such as recording of information using light of colors with different wavelengths in the same portion of the optical disk and for recording information having different layers from various angles.

Furthermore, a car ex210 having an antenna ex205 can receive data from the satellite ex202 and others, and repro- duce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 21. The same will be true for the configuration of the computer ex111, the cellular phone ex114, and others.

Figure 24A:
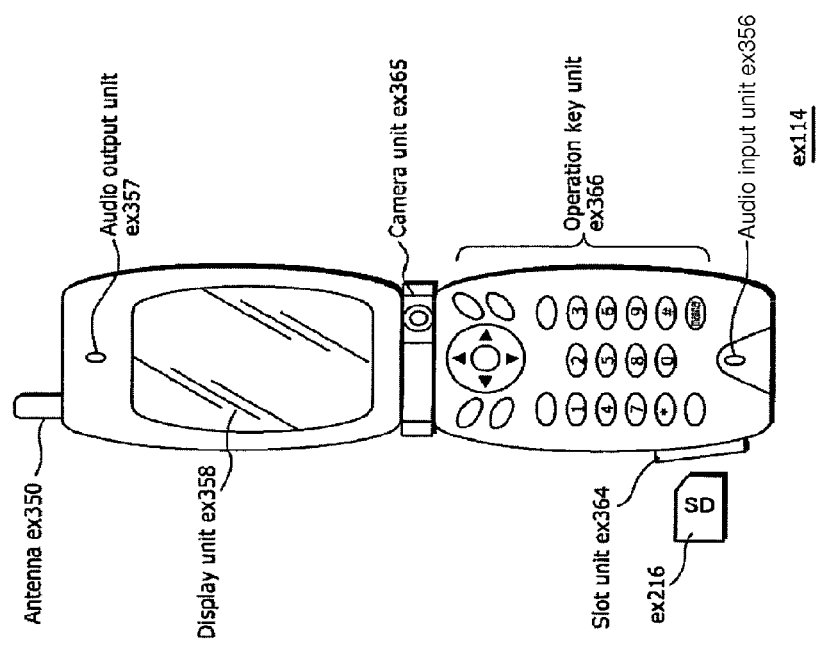
FIG. 24A is a schematic drawing illustrating an example of a cellular phone.

FIG. 24A illustrates the cellular phone ex114 that uses the video coding method and the video decoding method described in embodiments. The cellular phone ex114 includes: an antenna ex350 for transmitting and receiving radio waves through the base station ex110, a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 24B:
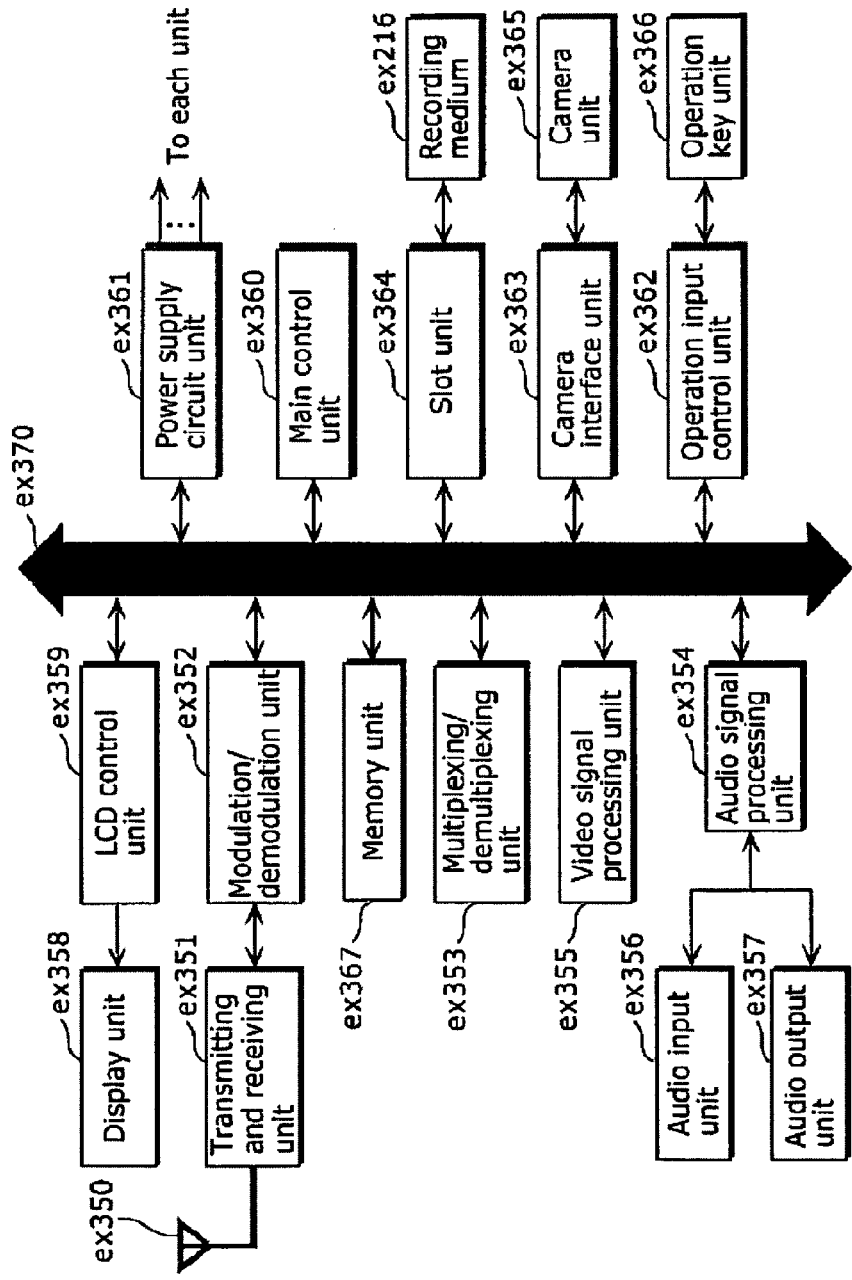
FIG. 24B is a block diagram showing an example of a configuration of the cellular phone.

Next, an example of a configuration of the cellular phone ex114 will be described with reference to FIG. 24B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a mul- tiplexing/demultiplexing unit ex353, an audio signal pro- cessing unit ex354, the slot unit ex364, and the memory unit ex367.

When a call-end key or a power key is turned ON by a user's operation, the power supply circuit unit ex361 sup- plies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modu- lation/demodulation unit ex352 performs spread spectrum processing on the digital audio signals, and the transmitting and receiving unit ex351 performs digital-to-analog conver- sion and frequency conversion on the data, so as to transmit the resulting data via the antenna ex350.

Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital- to-analog conversion and the frequency conversion on the resulting data to transmit the data to the base station ex110 via the antenna ex350. When an e-mail is received, process- ing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in each of embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal pro- cessing unit ex355 and the coded audio data supplied from the audio signal processing unit ex354, using a predeter- mined method. Then, the modulation/demodulation unit ex352 performs spread spectrum processing on the multiplexed data, and the transmitting and receiving unit ex351 performs digital-to- analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Video data can be generated by switching, as necessary, between (i) the video coding method or the video coding apparatus shown in each of embodiments and (ii) a video coding method or a video coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of embodiments will be hereinafter described. The multiplexed data is a digital stream in the MPEG2-Transport Stream format.

FIG. 25 illustrates a structure of the multiplexed data. As illustrated in FIG. 25, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the video coding method or by the video coding apparatus shown in each of embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 26:
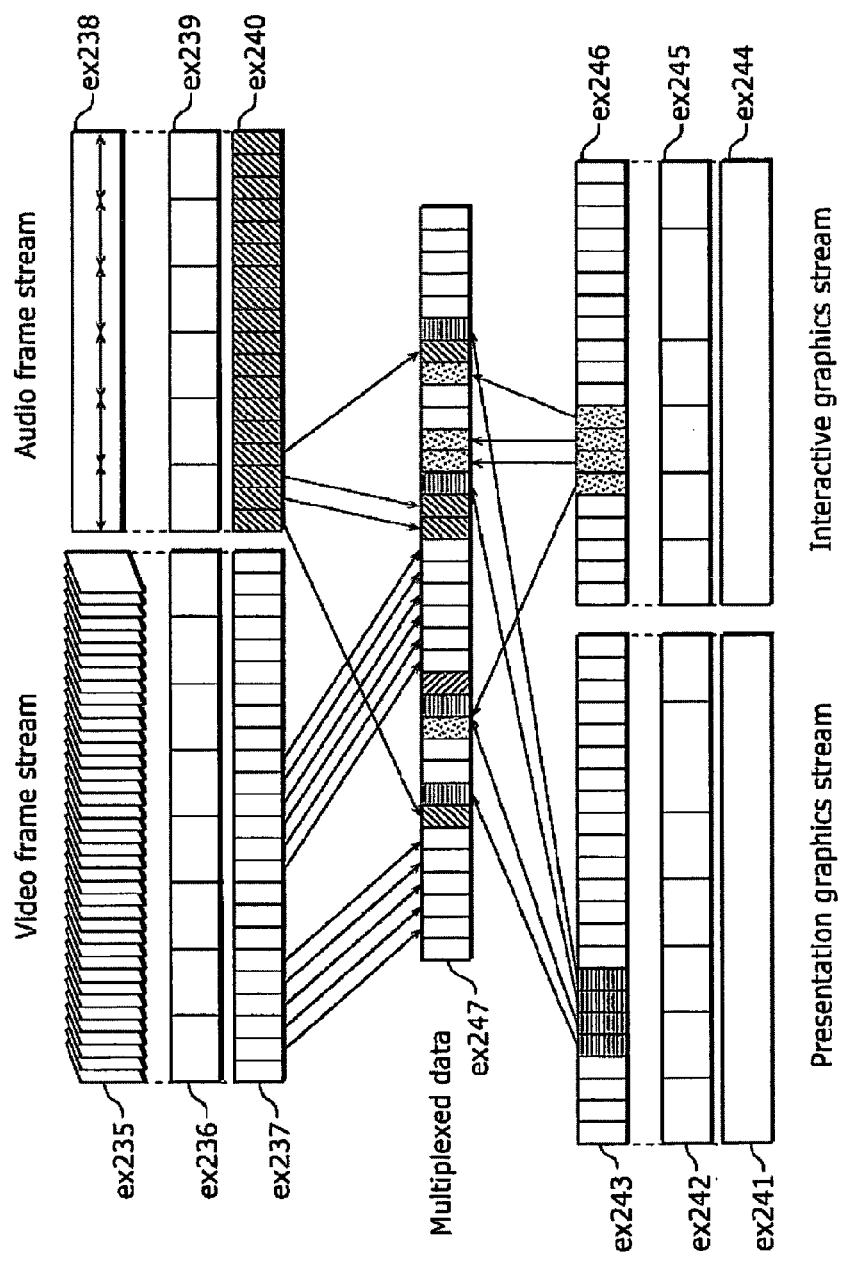
FIG. 26 is a drawing schematically illustrating how each of the streams is multiplexed in multiplexed data.

FIG. 26 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 27:
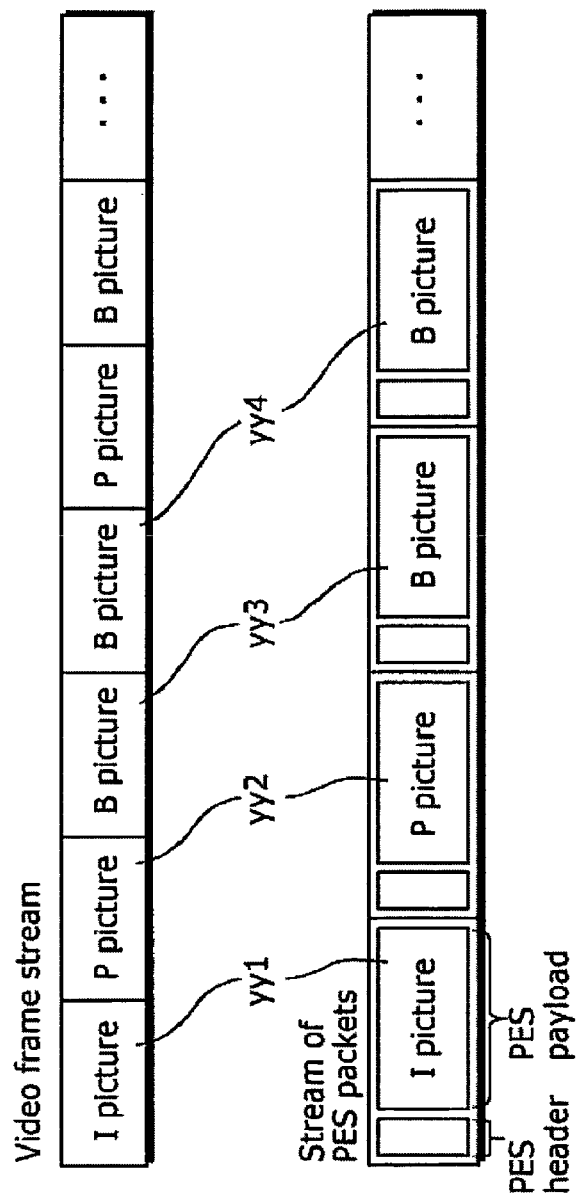
FIG. 27 is a schematic drawing illustrating how a video stream is stored in a stream of PES packets in more detail.

FIG. 27 illustrates how a video stream is stored in a stream of PES packets in more detail. The first bar in FIG. 27 shows a video frame stream in a video stream. The second bar shows the stream of PES packets. As indicated by arrows denoted as yy1, yy2, yy3, and yy4 in FIG. 27, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 28:
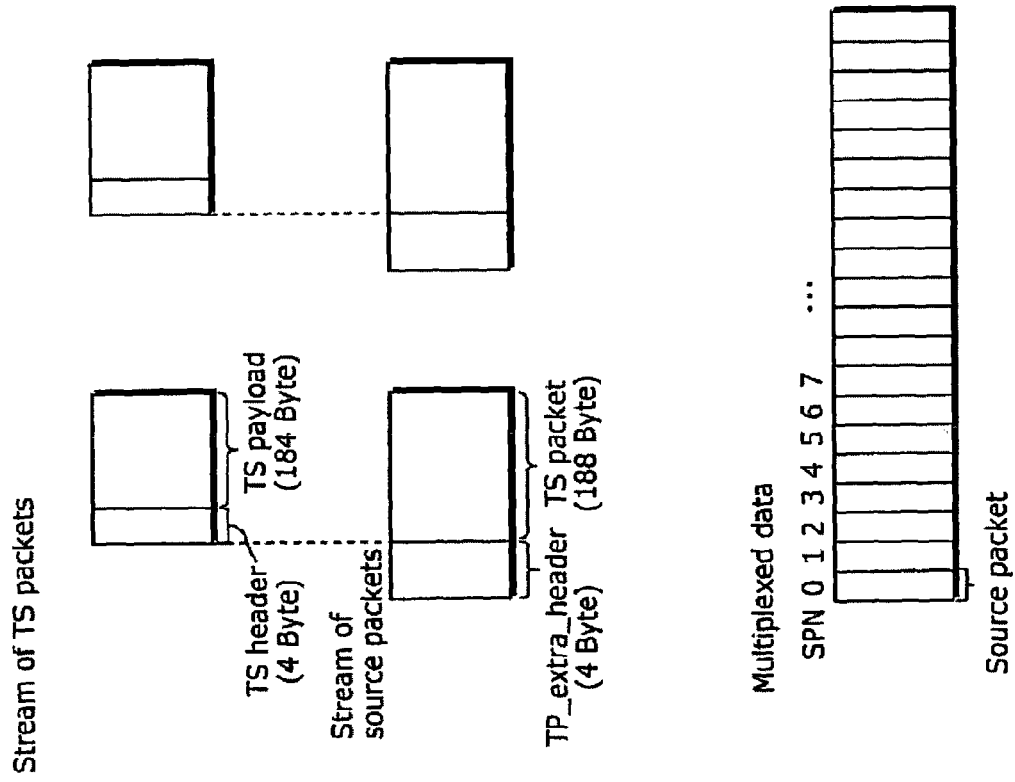
FIG. 28 is a schematic drawing showing a structure of TS packets and source packets in the multiplexed data.

FIG. 28 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PI D filter. The source packets are arranged in the multiplexed data as shown at the bottom of FIG. 28. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 29:
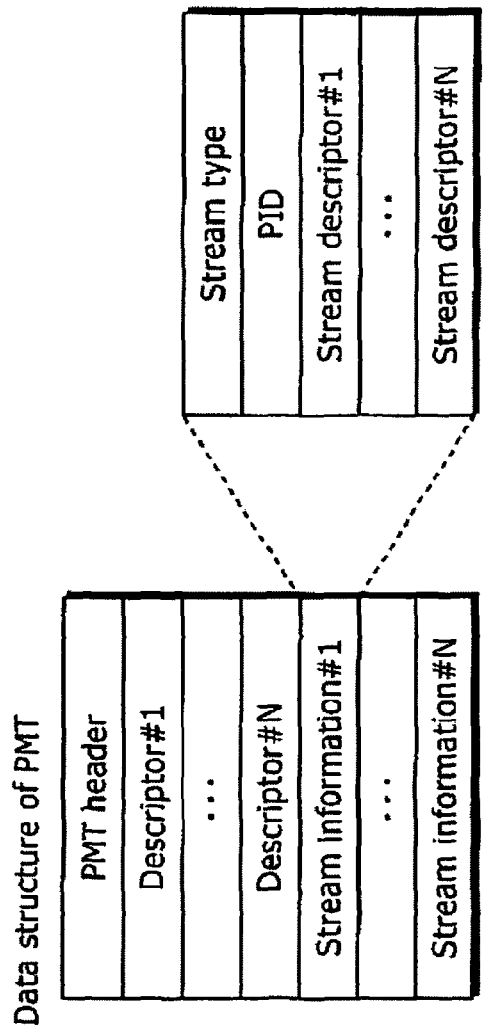
FIG. 29 is a schematic drawing showing a data structure of a PMT.

FIG. 29 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 30:
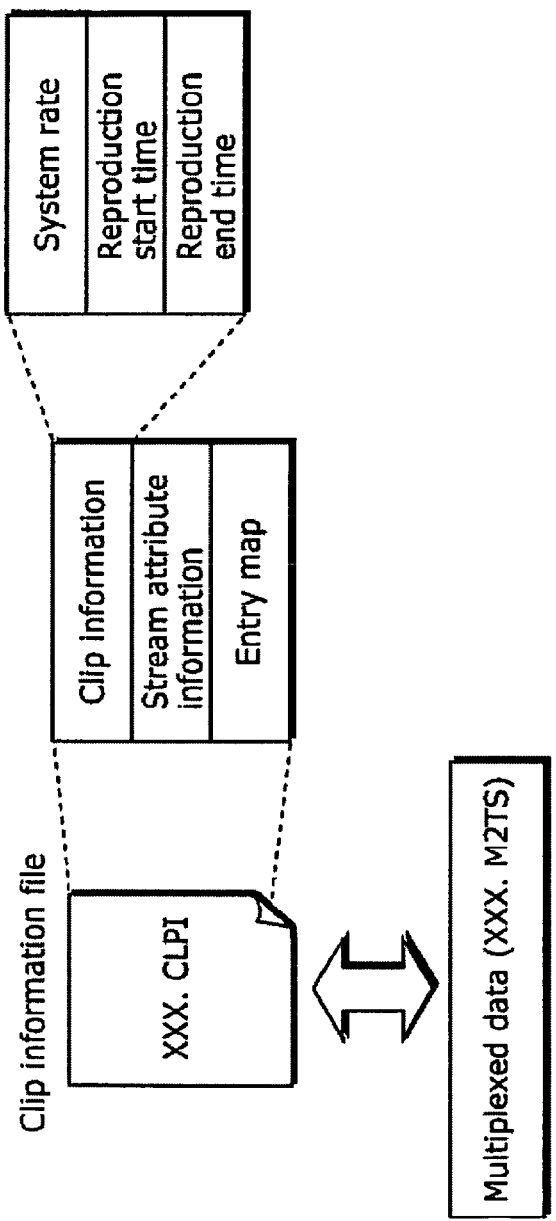
FIG. 30 is a schematic drawing showing an internal structure of multiplexed data information.

Each of the multiplexed data information files is management information of the multiplexed data as shown in FIG. 30. The multiplexed data information files are in one to one correspondence with the multiplexed data, and each of the files includes multiplexed data information, stream attribute information, and an entry map.

As illustrated in FIG. 30, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 31:
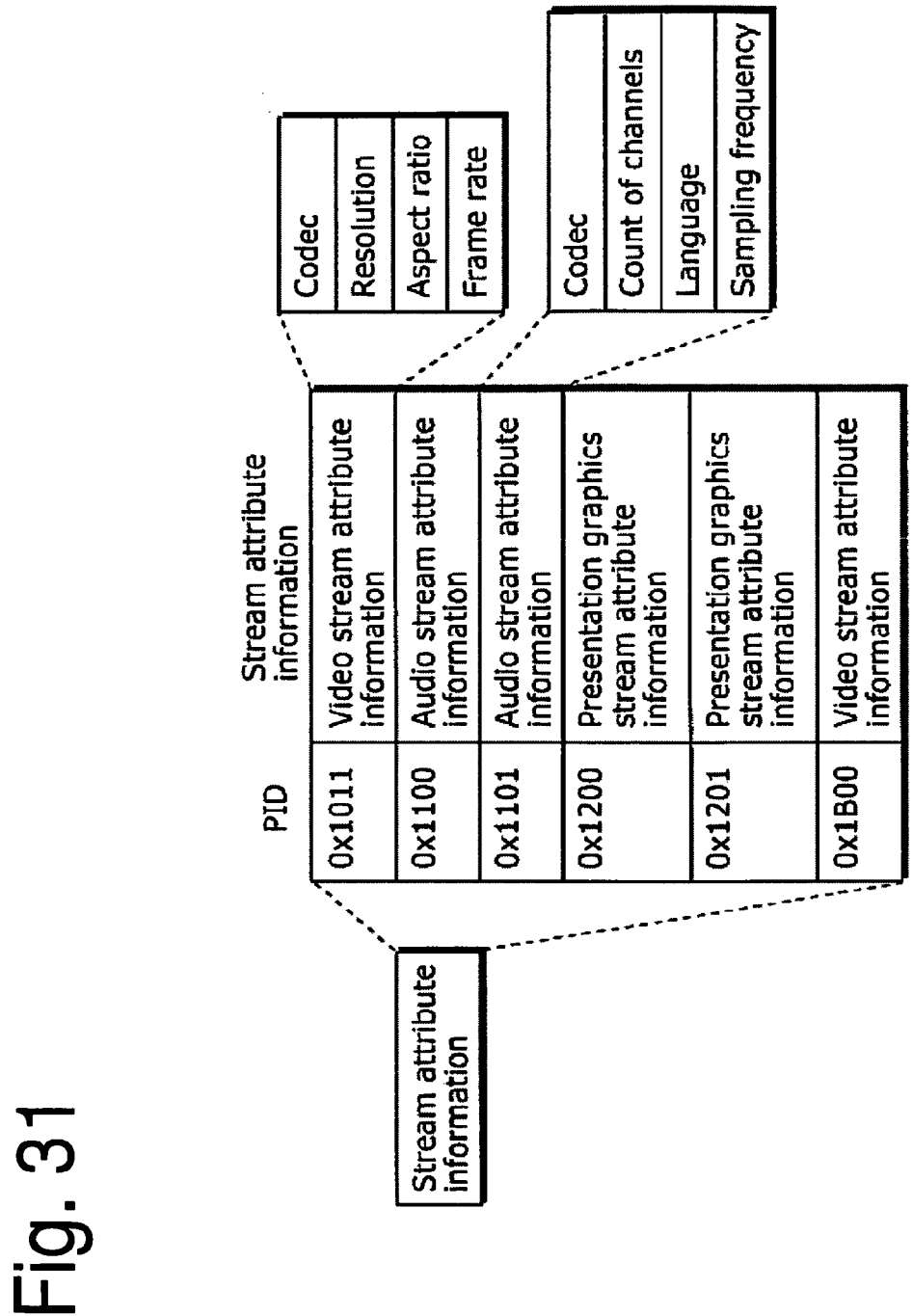
FIG. 31 is a schematic drawing showing an internal structure of stream attribute information.

As shown in FIG. 31, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

The multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of embodiments includes a step or a unit for allocating unique information indicating video data generated by the video coding method or the video coding apparatus in each of embodiments, to the stream type included in the PMT or the video stream attribute information. With the configuration, the video data generated by the video coding method or the video coding apparatus described in each of embodiments can be distinguished from video data that conforms to another standard.

Figure 32:
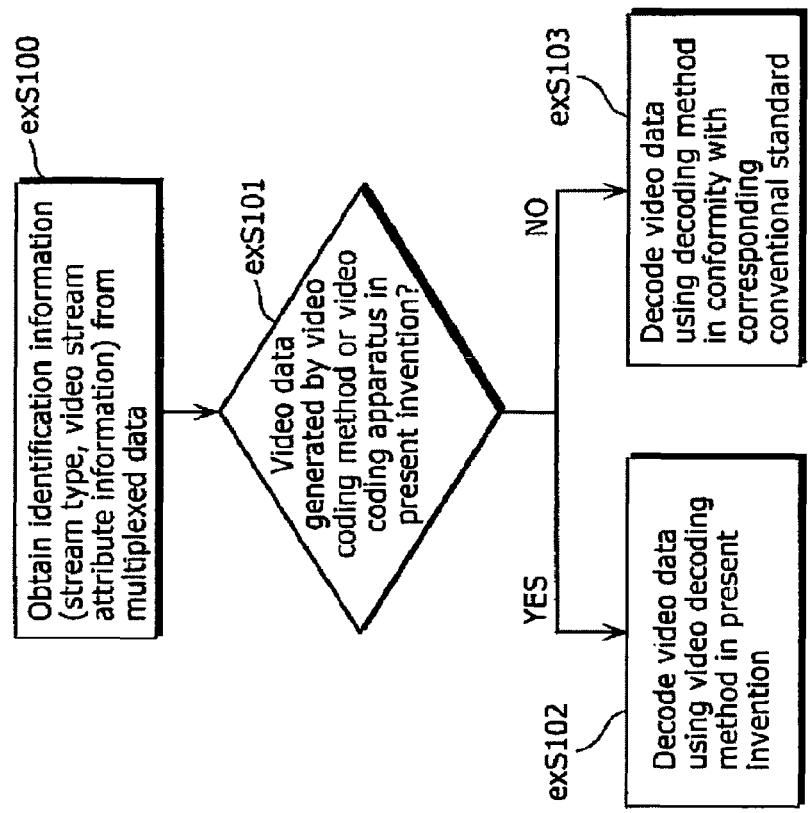
FIG. 32 is a schematic drawing showing steps for identifying video data.

Furthermore, FIG. 32 illustrates steps of the video decoding method. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of embodiments. When it is determined that the stream type or the video stream attribute information indicates that the multiplexed data is generated by the video coding method or the video coding apparatus in each of embodiments, in Step exS102, decoding is performed by the video decoding method in each of embodiments. Furthermore, when the stream type or the video stream attribute information indicates conformance to the conventional standards, such as MPEG-2, MPEG4-AVC, and VC-1, in Step exS103, decoding is performed by a video decoding method in conformity with the conventional standards.

As such, allocating a new unique value to the stream type or the video stream attribute information enables determination whether or not the video decoding method or the video decoding apparatus that is described in each of embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus can be used in the devices and systems described above.

Figure 33:
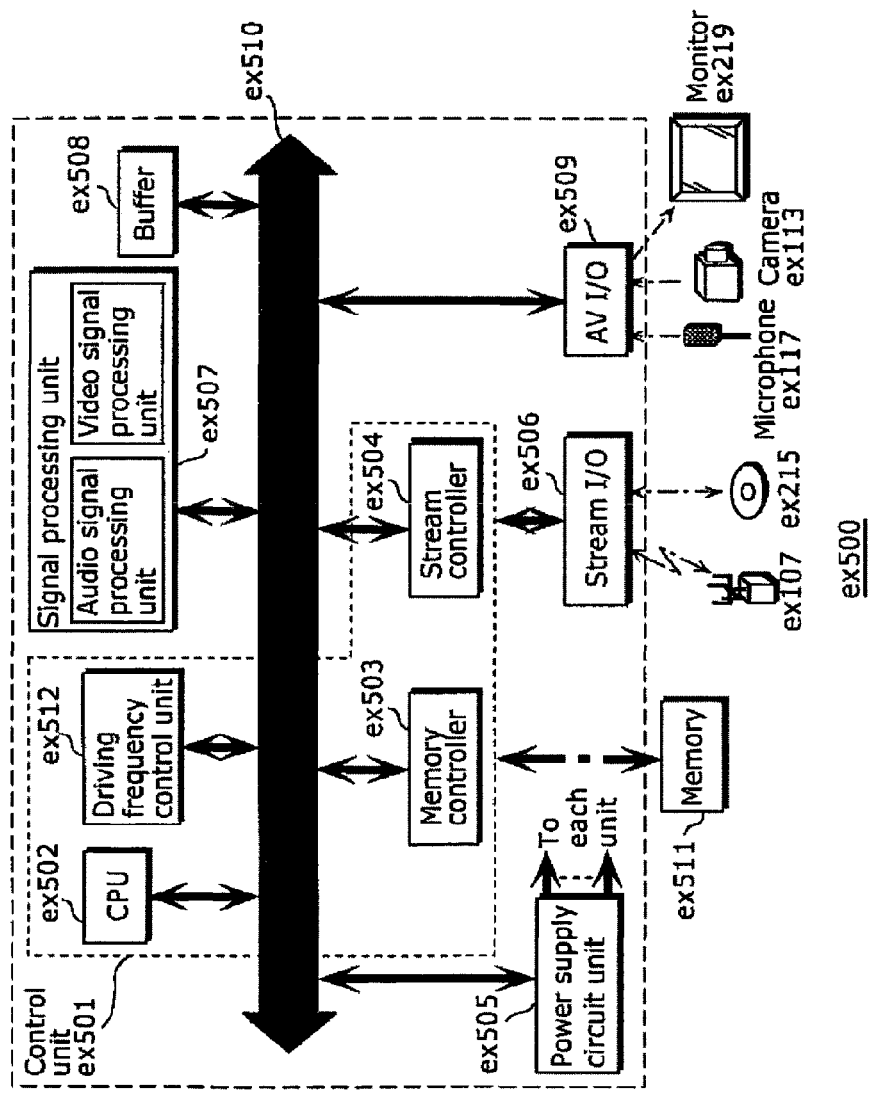
FIG. 33 is a schematic block diagram illustrating an example of a configuration of an integrated circuit for implementing the video coding method and the video decoding method according to each of embodiments.

Each of the video coding method, the video coding apparatus, the video decoding method, and the video decoding apparatus in each of embodiments is typically achieved in the form of an integrated circuit or a Large Scale Integrated (LSI) circuit. As an example of the LSI, FIG. 33 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV 10 ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

When video data generated in the video coding method or by the video coding apparatus described in each of embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 34:
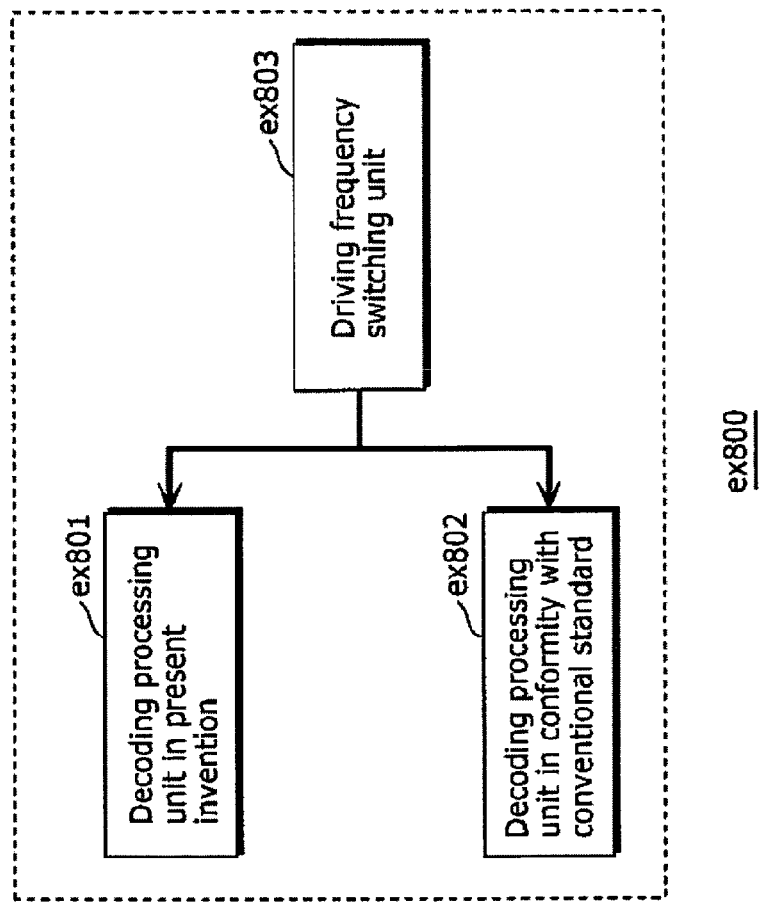
FIG. 34 is a schematic drawing showing a configuration for switching between driving frequencies.

In order to solve the problem, the video decoding apparatus, such as the television ex300 and the LSI ex500 is configured to determine to which standard the video data conforms, and switch between the driving frequencies according to the determined standard. FIG. 34 illustrates a configuration ex800. A driving frequency switching unit ex803 sets a driving frequency to a higher driving frequency when video data is generated by the video coding method or the video coding apparatus described in each of embodiments. Then, the driving frequency switching unit ex803 instructs a decoding processing unit ex801 that executes the video decoding method described in each of embodiments to decode the video data. When the video data conforms to the conventional standard, the driving frequency switching unit ex803 sets a driving frequency to a lower driving frequency than that of the video data generated by the video coding method or the video coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 33. Here, each of the decoding processing unit ex801 that executes the video decoding method described in each of embodiments and the decoding processing unit ex802 that conforms to the conventional standard corresponds to the signal processing unit ex507 in FIG. 33. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described is probably used for identifying the video data. The identification information is not limited to the one described above but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 36. The driving frequency can be selected by storing the look-up table in the buffer ex508 and in an internal memory of an LSI, and with reference to the look-up table by the CPU ex502.

Figure 35:
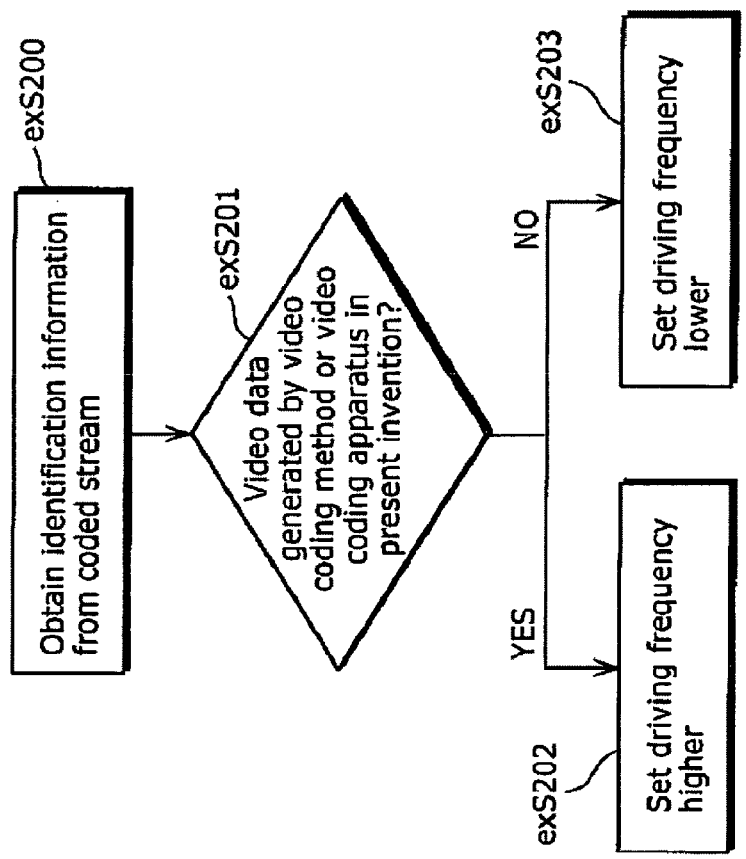
FIG. 35 is a schematic drawing showing steps for identifying video data and switching between driving frequencies.

FIG. 35 illustrates steps for executing a method. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the video coding method and the video coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the video coding method and the video coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG 4-AVC is larger than the processing amount for decoding video data generated by the video coding method and the video coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the video decoding method described in each of embodiments and the decoding processing unit that conforms to the conventional standard, such as MPEG-2, MPEG4-AVC, and VC-1 are partly shared. Ex900 in FIG. 37A shows an example of the configuration. For example, the video decoding method described in each of embodiments and the video decoding method that conforms to MPEG4-AVC have, partly in common, the details of processing, such as entropy coding, inverse quantization, deblocking filtering, and motion compensated prediction. The details of processing to be shared probably includes use of a decoding processing unit ex902 that conforms to MPEG4-AVC. In contrast, a dedicated decoding processing unit ex901 is probably used for other processing unique to the present invention. Since the present invention is characterized by application of filtering in a selected order, for example, the dedicated decoding processing unit ex901 is used for filtering. Otherwise, the decoding processing unit is probably shared for one of the entropy decoding, inverse quantization, spatial or motion compensated prediction, or all of the processing. The decoding processing unit for implementing the video decoding method described in each of embodiments may be shared for the processing to be shared, and a dedicated decoding processing unit may be used for processing unique to that of MPEG4-AVC.

Furthermore, ex1000 in FIG. 37B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

Most of the examples have been outlined in relation to an H.264/AVC based video coding system, and the terminology mainly relates to the H.264/AVC terminology. However, this terminology and the description of the various embodiments with respect to H.264/AVC based coding is not intended to limit the principles and ideas of the invention to such systems. Also the detailed explanations of the encoding and decoding in compliance with the H.264/AVC standard are intended to better understand the exemplary embodiments described herein and should not be understood as limiting the invention to the described specific implementations of processes and functions in the video coding. Nevertheless, the improvements proposed herein may be readily applied in the video coding described. Furthermore the concept of the invention may be also readily used in the enhancements of H.264/AVC coding currently discussed by the JVT.

Summarizing, the present invention relates to a method for encoding and decoding an image signal and to corresponding apparatuses therefor. In particular, during the encoding and/or decoding of an image signal filtering with at least two filters is performed. The sequence of the filter application and possibly the filters are selected and the filtering is applied in the selected filtering order and with the selected filters. The determination of the sequence of applying the filters may be performed either separately in the same way at the encoder and at the decoder, or, it may be determined at the encoder and signaled to the decoder.

The invention claimed is:

1. A method for decoding an image signal encoded in a bitstream, employing at least two different filters, a first filter and a second filter, in a filtering process performed when decoding the encoded image signal, the method comprising:

extracting, from the bitstream, an encoding parameter specifying a quantization step size;

determining to perform the filtering process in an order of the first filter followed by the second filter when the quantization step size specified by the encoding parameter is smaller than a threshold, and determining to perform the filtering process in an order of the second filter followed by the first filter when the quantization step size specified by the encoding parameter is larger than the threshold; and applying the first filter and the second filter according to the determined order when decoding the encoded image signal, wherein a value of the threshold is dynamically changed based on a size of a motion vector of a block to be decoded.

* * * * *